(12) United States Patent
Yamashita et al.

(10) Patent No.: US 11,243,228 B2
(45) Date of Patent: Feb. 8, 2022

(54) INFORMATION PROCESSING APPARATUS

(71) Applicant: Sony Corporation, Tokyo (JP)

(72) Inventors: Kosei Yamashita, Kanagawa (JP); Hidetoshi Kabasawa, Kanagawa (JP); Sho Murakoshi, Tokyo (JP); Tomohiro Matsumoto, Kanagawa (JP); Masahiro Segami, Kanagawa (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 16/349,166

(22) PCT Filed: Sep. 25, 2017

(86) PCT No.: PCT/JP2017/034493
§ 371 (c)(1),
(2) Date: May 10, 2019

(87) PCT Pub. No.: WO2018/088041
PCT Pub. Date: May 17, 2018

(65) Prior Publication Data
US 2019/0265269 A1     Aug. 29, 2019

(30) Foreign Application Priority Data

Nov. 11, 2016   (JP) .............................. JP2016-220961

(51) Int. Cl.
*G01P 15/18*     (2013.01)
*A63B 24/00*     (2006.01)
(Continued)

(52) U.S. Cl.
CPC .......... *G01P 15/18* (2013.01); *A63B 24/0003* (2013.01); *A63B 24/0062* (2013.01);
(Continued)

(58) Field of Classification Search
CPC .. G01P 15/18; G01P 3/44; G01P 15/09; G01P 21/00; G01B 21/10;
(Continued)

(56) References Cited

U.S. PATENT DOCUMENTS

| 2011/0202225 A1 | 8/2011 | Willis et al. |
| 2013/0095939 A1* | 4/2013 | Meadows .......... A63B 71/0669 473/222 |

(Continued)

FOREIGN PATENT DOCUMENTS

| CN | 1884979 A | 12/2006 |
| CN | 1926434 A | 3/2007 |

(Continued)

OTHER PUBLICATIONS

International Search Report and Written Opinion issued in connection with International Patent Application No. PCT/JP2017/034493, dated Dec. 19, 2017. (8 pages).

(Continued)

*Primary Examiner* — Aditya S Bhat
(74) *Attorney, Agent, or Firm* — K&L Gates LLP

(57) ABSTRACT

A motion measurement apparatus according to an embodiment of the present technology includes a controller unit. The controller unit extracts, from an acceleration in each direction of three axes that includes a dynamic acceleration component and a static acceleration component of a detection target that moves within a space, the dynamic acceleration component of the detection target, and generates, as (Continued)

a control signal, a change in kinematic physical quantity of a posture of the detection target from the dynamic acceleration component.

10 Claims, 16 Drawing Sheets

(51) Int. Cl.
*A63B 69/36* (2006.01)
*G01P 3/44* (2006.01)
*G01P 15/09* (2006.01)
*G01B 21/00* (2006.01)
*G01P 21/00* (2006.01)
*A63B 71/06* (2006.01)

(52) U.S. Cl.
CPC .............. *A63B 69/36* (2013.01); *G01B 21/00* (2013.01); *G01P 3/44* (2013.01); *G01P 15/09* (2013.01); *G01P 21/00* (2013.01); *A63B 71/0622* (2013.01); *A63B 2071/0625* (2013.01); *A63B 2071/0647* (2013.01); *A63B 2220/40* (2013.01); *A63B 2220/833* (2013.01)

(58) Field of Classification Search
CPC .......... A63B 2220/833; A63B 2220/40; A63B 2071/0647; A63B 2071/0625; A63B 71/0622; A63B 69/36; A63B 24/0003; A63B 24/0062
See application file for complete search history.

(56) References Cited

U.S. PATENT DOCUMENTS

| | | | |
|---|---|---|---|
| 2013/0186202 A1 | 7/2013 | Hansen | |
| 2015/0355805 A1* | 12/2015 | Chandler | ............ G06F 3/04842 715/784 |
| 2021/0007874 A1* | 1/2021 | Galiana Bujanda | ... B25J 9/0006 |

FOREIGN PATENT DOCUMENTS

| | | |
|---|---|---|
| CN | 101173878 A | 5/2008 |
| CN | 101570177 A | 11/2009 |
| CN | 103069278 A | 4/2013 |
| CN | 103884870 A | 6/2014 |
| CN | 103984416 A | 8/2014 |
| CN | 104956648 A | 9/2015 |
| EP | 2710334 A | 3/2014 |
| EP | 1953499 B1 | 9/2017 |
| JP | 2004-264060 A | 9/2004 |
| JP | 2010119822 A | 6/2010 |
| WO | 2008/026357 A1 | 3/2008 |
| WO | 2015/146045 A1 | 10/2015 |
| WO | 2016/024565 A1 | 2/2016 |

OTHER PUBLICATIONS

<<Application of Single Chip Microprocessor and Embedded System>> Liu Xiangqing << ARM7 Acceleration Data Acquisition System Design>> Dec. 1, 2010.
<<Ship Engineering>>Zhang Yue <<Study on Application of Single Axis Accelerometer in Axial Power Measurement > > Aug. 15, 2016.

* cited by examiner

INFORMATION PROCESSING APPARATUS

CROSS-REFERENCE TO RELATED APPLICATIONS

The present application claims the benefit of International Application No. PCT/JP2017/034493, filed Sep. 25, 2017, which claims priority to Japanese Application No. 2016-220961, filed Nov. 11, 2016, the disclosures of which are incorporated herein by reference.

BACKGROUND

The present technology relates to an information processing apparatus that measures a trajectory of a body motion of a user, for example.

In recent years, in the fields of sports science, human science, and the like, an apparatus that analyzes the motion of a human or an object has been developed. As this type of apparatus, there are known an inertial sensor type that measures a motion from an output of an acceleration sensor, a gyro sensor, or the like attached to a detection target, an optical type that images a plurality of markers attached to a detection target with a camera and processes the camera image to measure a motion, and the like.

In processing using an inertial sensor, in order to calculate a movement distance or a direction from an output of the inertial sensor, it is necessary to perform integration twice in a case of using an acceleration sensor or perform integration once in a case of using an angular velocity sensor (see, for example, Patent Literature 1). Specifically, angular velocities in three-axis directions, which are obtained from a gyro sensor, are integrated to obtain a posture angle, and a gravity component is estimated and obtained from the posture angle. The gravity component obtained from the previously-calculated posture angle is then subtracted from accelerations in the three-axis directions, which are obtained from an acceleration sensor, and an acceleration for a global coordinate system is calculated and subjected to double integration, thus obtaining a position in a global coordinate system.

SUMMARY

Technical Problem

However, in a case where the detection target is moving, an error occurs in a posture angle to be obtained by the gyro sensor, and the error is accumulated with time. For that reason, a gravitational acceleration component to be obtained by the gyro sensor is insufficiently cancelled from an acceleration calculated from the acceleration sensor. Therefore, position information, which is calculated by integrating such an acceleration in which the gravitational acceleration component is not sufficiently cancelled, has not been correct, the obtained position information has included the accumulated errors of sensor output values and has diverged, and a trajectory or the like of a motion of the detection target has not been correctly obtained.

In view of the circumstances as described above, it is an object of the present technology to provide an information processing apparatus capable of more accurately obtaining a change in kinematic physical quantity of a detection target.

Solution to Problem

An information processing apparatus according to an embodiment of the present technology includes a controller unit.

The controller unit extracts, from an acceleration that includes a dynamic acceleration component and a static acceleration component of a detection target that moves within a space, the dynamic acceleration component of the detection target, and generates, as a control signal, a change in kinematic physical quantity of the detection target from the dynamic acceleration component.

In the information processing apparatus described above, since the controller unit is configured to extract the dynamic acceleration component and generate, as a control signal, the change in kinematic physical quantity of the detection target on the basis of the acceleration from which the static acceleration component is substantially removed, the kinematic physical quantity of the detection target, such as an acceleration, a velocity, a position, or a distance can be more correctly grasped. In other words, since the control signal is generated on the basis of the acceleration from which the static acceleration component (gravitational acceleration component) is substantially removed, the accumulation of errors due to the remaining static acceleration component can be reduced, and the calculated kinematic physical quantity of the detection target can be more correctly obtained.

The controller unit may calculate a temporal change in position of the detection target within the space from the dynamic acceleration component, and generate the control signal on a basis of the temporal change in position.

With this configuration, a temporal change in position of the detection target, i.e., a trajectory of a motion of the detection target can be grasped.

The controller unit includes an acceleration arithmetic unit that extracts the dynamic acceleration component and the static acceleration component for each direction of the three axes on a basis of, for example, a first detection signal having an alternating-current waveform corresponding to the acceleration and a second detection signal having an output waveform in which an alternating-current component corresponding to the acceleration is superimposed on a direct-current component.

The acceleration arithmetic unit may include an arithmetic circuit that extracts the static acceleration component from the acceleration on a basis of a difference signal between the first detection signal and the second detection signal.

With this configuration, the static acceleration component can be extracted from acceleration information.

The acceleration arithmetic unit may further include a gain adjustment circuit that adjusts gain of each signal such that the first detection signal and the second detection signal have an identical level.

The acceleration arithmetic unit may further include a correction circuit that calculates a correction coefficient on a basis of the difference signal and corrects one of the first detection signal and the second detection signal by using the correction coefficient.

The controller unit may further include an angular velocity arithmetic unit that calculates an angular velocity about each of the three axes on a basis of a third detection signal including information related to the angular velocity about each of the three axes.

The information processing apparatus may further include a detector unit that acquires the acceleration.

The detector unit may include a sensor element.

The sensor element includes an element main body that includes a movable portion movable by reception of an acceleration, a piezoelectric first acceleration detector unit that outputs a first detection signal including information related to the acceleration in each direction of the three axes that acts on the movable portion, and a non-piezoelectric second acceleration detector unit that outputs a second detection signal including information related to the acceleration in each direction of the three axes that acts on the movable portion.

In such a sensor element, both of the piezoelectric first acceleration detector unit and the non-piezoelectric second acceleration detector unit detect the dynamic acceleration component (AC component) such as a motion acceleration, but the non-piezoelectric second acceleration detector unit can detect not only the AC component but also the static acceleration component (DC component) such as a gravitational acceleration. In this regard, in the present technology, the sensor element is configured to use the difference in detection methods for those first and second acceleration detector units, to separate and extract the dynamic acceleration component and the static acceleration component from those outputs (first detection signal and second detection signal). By use of such a sensor element, a dynamic acceleration that acts on the detection target can be accurately measured, and the position of the detection target can be correctly grasped.

The second acceleration detector unit may include a piezoresistive acceleration detection element that is provided to the movable portion.

Alternatively, the second acceleration detector unit may include an electrostatic acceleration detection element that is provided to the movable portion.

Advantageous Effects of Invention

As described above, according to the present technology, it is possible to more correctly acquire a change in kinematic physical quantity such as an acceleration, a velocity, a position, or a distance of a detection target.

It should be noted that the effects described herein are not necessarily limited, and any of the effects described in the present disclosure may be produced.

DETAILED DESCRIPTION

Hereinafter, an embodiment according to the present technology will be described with reference to the drawings. The present technology is applicable to a so-called motion capture system or the like and measures a change in kinematic physical quantity of a detection target on the basis of information from a sensor attached to a human or another moving object as the detection target.

[General Outline of Apparatus]

Figure 1:
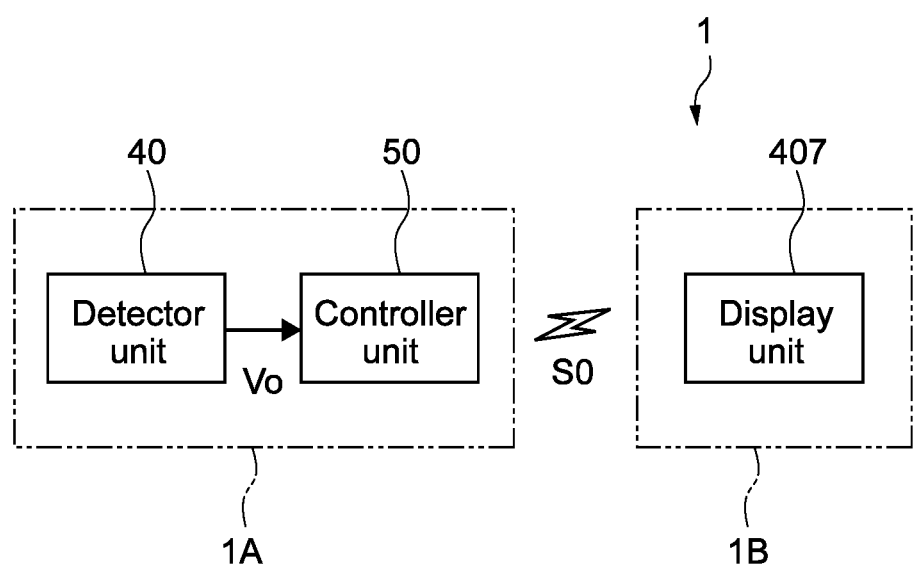
FIG. 1 is a block diagram showing a schematic configuration of a motion measurement apparatus according to an embodiment of the present technology.
Figure 2:
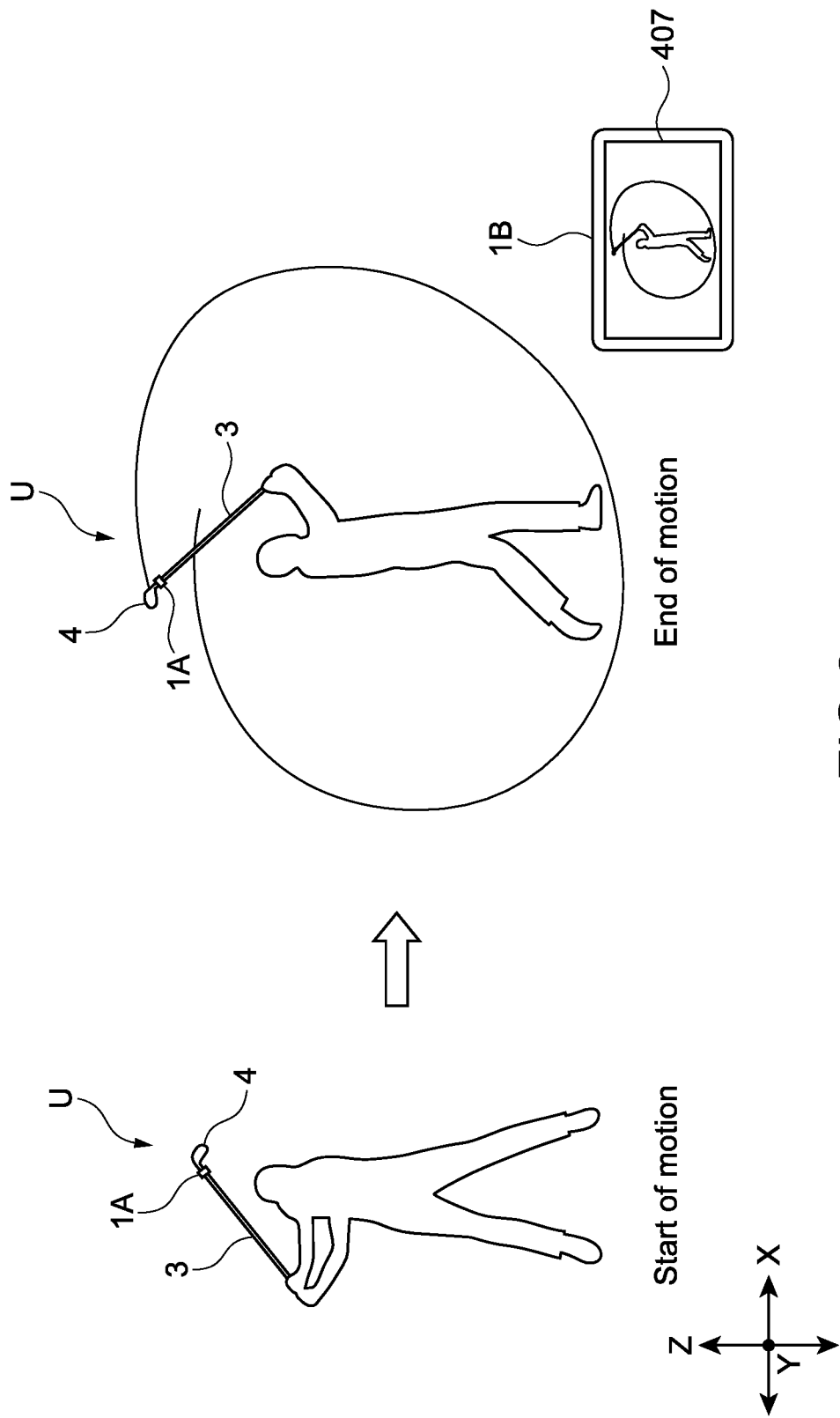
FIG. 2 is a schematic view for describing an application example of the motion measurement apparatus.

FIG. 1 is a block diagram showing a schematic configuration of a motion measurement apparatus according to an embodiment of the present technology. FIG. 2 is a schematic view for describing an application example of the motion measurement apparatus.

As shown in FIG. 1, a motion measurement apparatus 1 of this embodiment includes a sensor device 1A and a terminal device 1B, the sensor device 1A including a detector unit 40 and a controller unit 50, the terminal device 1B including a display unit 407. The motion measurement apparatus 1 is configured to display, for example, as an image, a change in kinematic physical quantity of a detection target that is moving within a space.

The sensor device 1A is configured to be mountable to a detection target part of a user U. The terminal device 1B is configured to be communicable with the sensor device 1A wirelessly or wiredly and is typically constituted of a portable information terminal such as a smartphone, a mobile phone, or a laptop PC (personal computer).

In this embodiment, for example, as shown in FIG. 2, the sensor device 1A is mounted to a neck part immediately above a head 4 of a golf club 3, which is an exercise tool used by the user U who practices golf swing. The sensor device 1A is configured to extract a kinematic physical quantity from the start of a motion (for example, start of downswing) to the end of the motion (end of follow-through after impact) of the user U at each predetermined point of time or continuously and transmit the kinematic physical quantity to the terminal device 1B.

The sensor device 1A detects accelerations in directions of three orthogonal axes (x axis, y axis, and z axis in FIG. 6) and angular velocities about the three axes. The sensor device 1A is attached with one axis among the three axes, e.g., the z axis, being set along the long-axis direction of the shaft of the golf club 3. When the sole of the golf club 3 is positioned on the horizontal plane, the sensor device 1A tilts at a predetermined angle in a perpendicular direction with respect to the horizontal plane. Further, the sensor device 1A is attached such that another detection axis (for example, x axis) has a direction in which a direction perpendicular to the surface of the face when, for example, the sole of the golf club 3 is positioned on the horizontal plane, is projected onto the horizontal plane.

The terminal device 1B is configured to notify the user U of a change in kinematic physical quantity of the golf club 3, which is acquired from the detector unit 40. For example, in this embodiment, a temporal change in position of the golf club within the space is displayed on the display unit 407 of the terminal device 1B such that the user U is notified of the change as a trajectory of the swing of the club.

The sensor device 1A includes a casing (not shown in the figure) including a mounting tool attachable to the golf club 3, such as a band or a clip, and the detector unit 40 and the controller unit 50 housed in the casing.

The detector unit 40 detects velocity-related information Vo that is related to temporal changes in velocities in directions of three orthogonal axes (x axis, y axis, and z axis in FIG. 6) in a local coordinate system. The controller unit 50 calculates the kinematic physical quantity of the user U (sensor device 1A) from the detected velocity-related information Vo and generates and outputs a change in kinematic physical quantity as a control signal S0. Specifically, in this embodiment, the controller unit 50 calculates, on the basis of an output of the detector unit 40, a position and a posture angle of the detection target (sensor device 1A) in directions of three orthogonal axes (X, Y, and Z axes in FIG. 2) in a real space (global coordinate system), and generates and outputs a trajectory image signal (control signal) S0 on the basis of the position and the posture angle.

The user U as a detection target includes not only the user himself/herself but also an exercise tool used by the user. In a case where the detection target is the user himself/herself, more specifically, a part of the body to which the sensor device 1A is to be attached (e.g., arm, leg, head part, or lumbar part) corresponds to the detection target. The sensor device 1A is not limited to the case where the sensor device 1A is directly attached to the body of the user, but may be attached to a part that is moves integrally with the user, such as clothing, a hat, a shoe, a glove, a wristband, or a belt.

Meanwhile, examples of the exercise tool include sports-specific tools such as a club, a bat, a racket, and a baton used by a user in the user's hand.

As shown in FIG. 2, the terminal device 1B includes the display unit 407 and displays, on the basis of the trajectory image signal S0, a change in position of the user U as a trajectory on the display unit 407.

Hereinafter, the details of the motion measurement apparatus 1 according to this embodiment will be described.

[Basic Configuration]

Figure 3:
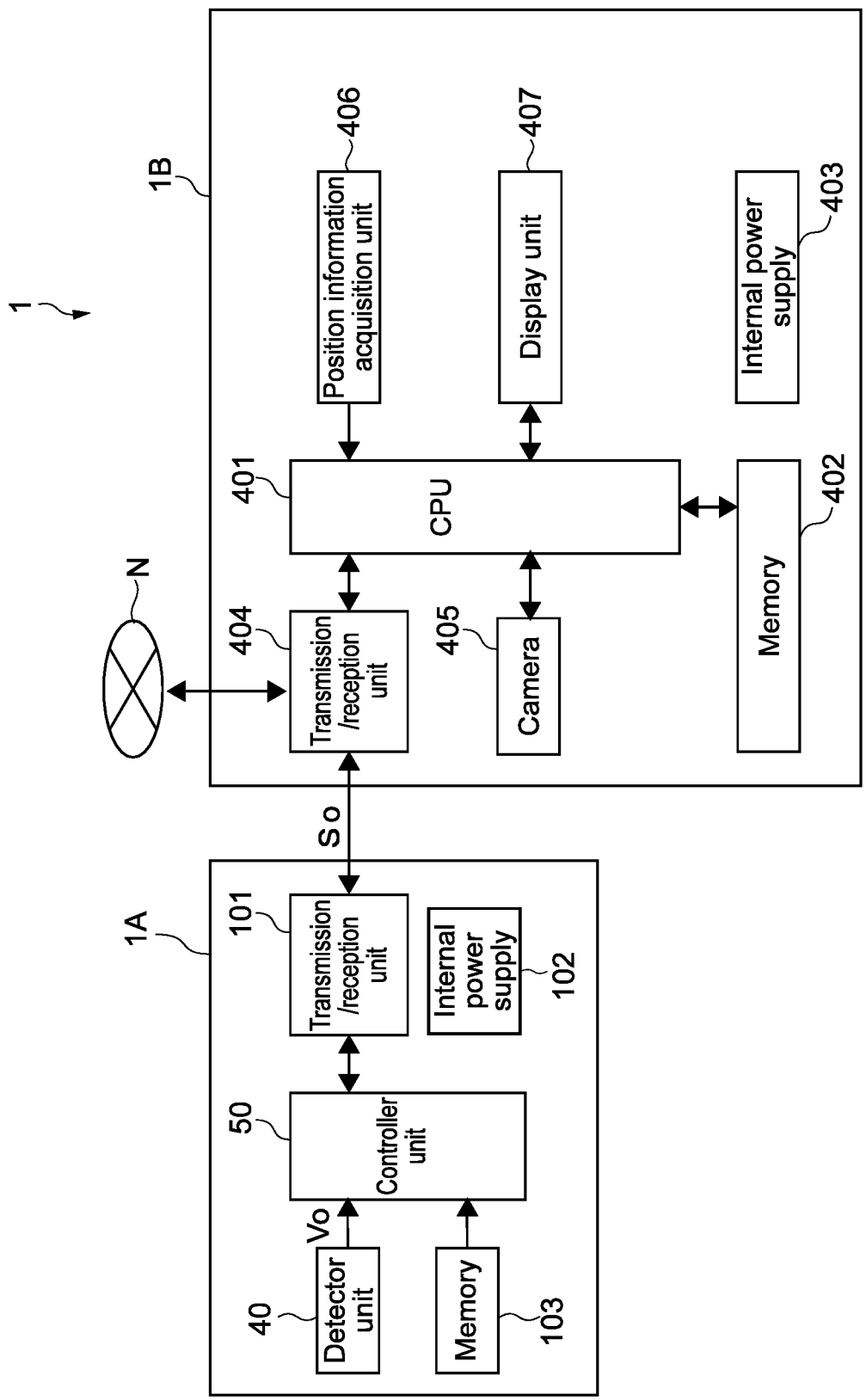
FIG. 3 is a system configuration diagram of the motion measurement apparatus.
Figure 4:
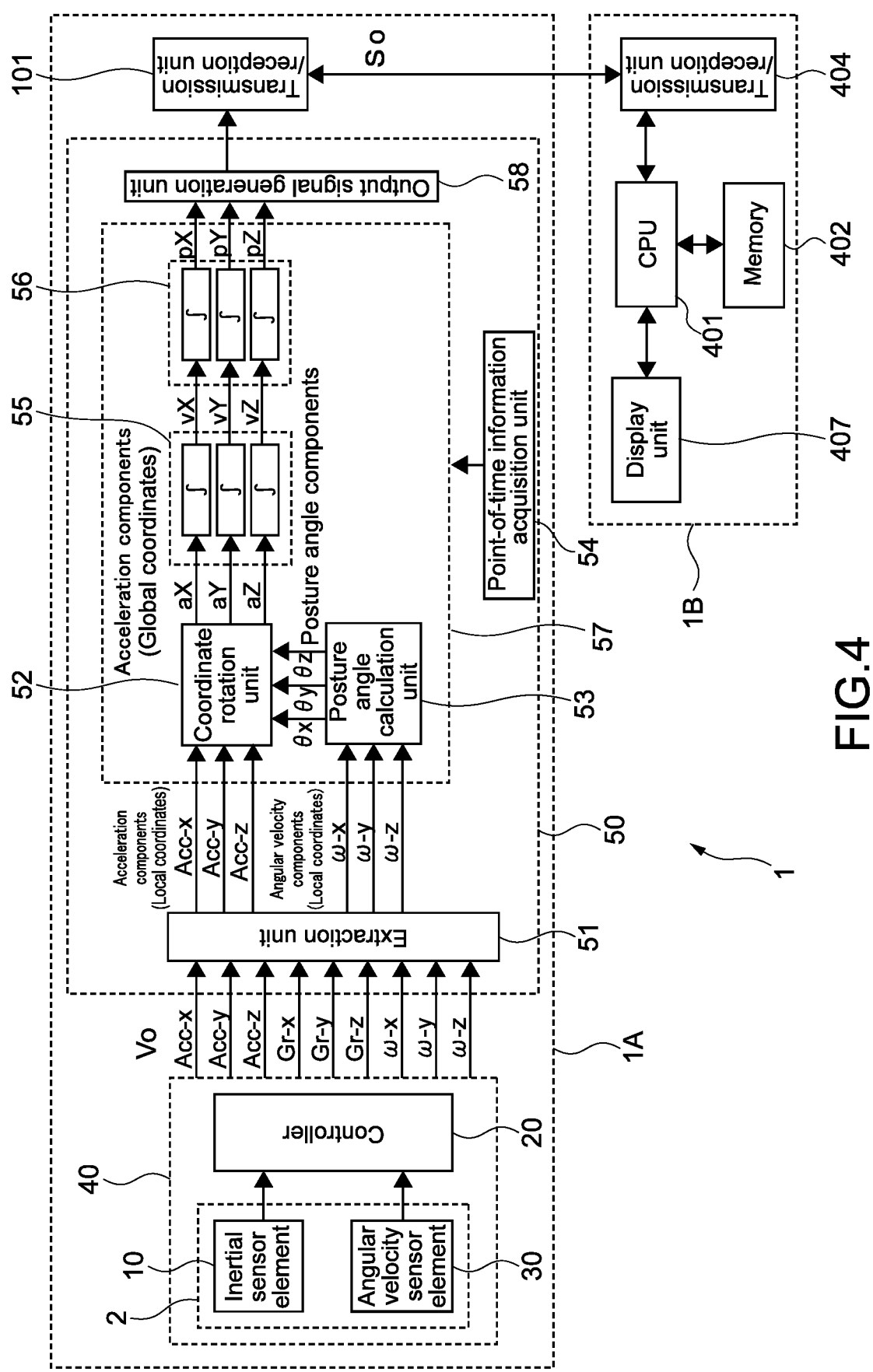
FIG. 4 is a block diagram showing a basic configuration of a main part of the motion measurement apparatus.

FIG. 3 is a system configuration diagram of the motion measurement apparatus 1, and FIG. 4 is a block diagram of a basic configuration of a main part thereof. The motion measurement apparatus 1 constitutes a measurement system including the sensor device 1A and the terminal device 1B.

(Sensor Device)

The sensor device 1A includes the detector unit 40, the controller unit 50, a transmission/reception unit 101, an internal power supply 102, a memory 103, and a power supply switch (not shown in the figure).

The detector unit 40 is an inertial sensor including an inertial sensor unit 2 and a controller 20.

The inertial sensor unit 2 includes an acceleration sensor element 10 and an angular velocity sensor element 30. The acceleration sensor element 10 detects the accelerations in the directions of the three orthogonal axes (x axis, y axis, and z axis in FIG. 6) in the local coordinate system. The angular velocity sensor element 30 detects the angular velocities about the three axes. The controller 20 processes an output from the inertial sensor unit 2.

In the inertial sensor unit 2 of this embodiment, the acceleration sensor and the angular velocity sensor for each axis are separately constituted, but the present technology is not limited thereto. The acceleration sensor and the angular velocity sensor may be constituted of a single sensor that is capable of simultaneously detecting accelerations and angular velocities in the three-axis directions.

In the detector unit 40, dynamic acceleration components (Acc-x, Acc-y, Acc-z), static acceleration components (Gr-x, Gr-y, Gr-z), and angular velocity signals (ω-x, ω-y, ω-z) in the local coordinate system, which are acquired in predetermined sampling periods, are calculated as the velocity-related information Vo by the controller 20 on the basis of detection results of the inertial sensor unit 2, and are sequentially output to the controller unit 50.

In the detector unit 40, an acceleration detection signal including dynamic acceleration components and static acceleration components about the three axes of the user U (sensor device 1A), which are detected from the acceleration sensor element 10, is separated into the dynamic acceleration components (Acc-x, Acc-y, Acc-z) and the static acceleration components (Gr-x, Gr-y, Gr-z) by the controller 20. The configuration of the acceleration sensor element 10 and the separation of the dynamic velocity components and the static acceleration components, which is performed by the controller 20, will be described later in detail.

Further, in the detector unit 40, angular velocity signals about the three axes (ω-x, ω-y, ω-z) are each calculated by the controller 20 on the basis of angular velocity detection signals about the three axes (Gyro-x, Gyro-y, Gyro-z) of the user U (sensor device 1A), which are detected from the angular velocity sensor element 30. The angular velocity sensor element 30 detects angular velocities about the x, y, and z axes (hereinafter, also referred to as angular velocity components in local coordinate system), respectively. For the angular velocity sensor element 30, a vibration type gyro sensor is typically used. In addition thereto, a rotary top gyro sensor, a laser ring gyro sensor, a gas rate gyro sensor, and the like may be used.

The controller unit 50 includes an extraction unit 51, an inertial navigation calculation unit 57, a point-of-time information acquisition unit 54, and an output signal generation unit 58.

It should be noted that the controller unit 50 may be achieved by hardware elements such as a CPU (Central Processing Unit), a RAM (Random Access Memory), and a ROM (Read Only Memory) used in a computer and necessary software. Instead of or in addition to the CPU, a PLD (Programmable Logic Device) such as a FPGA (Field Programmable Gate Array), a DSP (Digital Signal Processor), or the like may be used.

The controller unit 50 is constituted as an information processing apparatus that generates, from the velocity-related information Vo and the angular velocity signals output from the detector unit 40, a trajectory image signal (control signal) S0 for displaying on the display unit 407 an image of a change in motion of the user U (sensor device 1A) in the form of a trajectory. The trajectory image signal (control signal) S0 generated in the controller unit 50 is transmitted to the terminal device 1B.

The extraction unit 51 extracts dynamic acceleration component signals about the three axes (Acc-x, Acc-y, Acc-z) and the angular velocity signals about the three axes (ω-x, ω-y, ω-z) from the velocity-related information Vo and the angular velocity signals of the detection target, which are output from the detector unit 40. The dynamic acceleration component signals (Acc-x, Acc-y, Acc-z) extracted in the extraction unit 51 are output to a coordinate rotation unit 52 of the inertial navigation calculation unit 57, and the angular velocity signals (ω-x, ω-y, ω-z) are output to a posture angle calculation unit 53 of the inertial navigation calculation unit 57.

The inertial navigation calculation unit 57 calculates an acceleration, a velocity, a position, a posture angle, and the like of the user U (sensor device 1A) in the global coordinate system on the basis of the signals input from the detector unit 40 and point-of-time information supplied from the point-of-time information acquisition unit 54, and outputs those pieces of information to the output signal generation unit 58.

The point-of-time information acquisition unit 54 gives the point-of-time information to the inertial navigation calculation unit 57. The point-of-time information is acquired from, for example, a built-in clock of the controller unit 50.

The output information generation unit 58 generates, on the basis of the information input from the inertial navigation calculation unit 57, for example, a trajectory image signal (control signal) S0 for displaying on the display unit 407 an image of a change in motion of the user U (sensor device 1A), i.e., an image of a trajectory of the motion, and outputs the trajectory image signal (control signal) S0 to the transmission/reception unit 101. In this embodiment, the output information generation unit 58 functions as a trajectory information generation unit.

Pieces of information, with which a detected point of time from the point-of-time information acquisition unit 54 (point-of-time information), the acceleration, the velocity, the position, and the posture angle are associated and which are arranged in chronological order, are input to the output information generation unit 58. In this embodiment, the control signal is generated such that a change in position, as a kinematic physical quantity, of the user U, is displayed as a trajectory of the motion of the user U on the display unit 407, but the present technology is not limited thereto. For example, the control signal may be generated such that a change in motion of the user U is displayed as a log with which the acceleration and the velocity are associated at each point of time.

The inertial navigation calculation unit 57 includes the coordinate rotation unit 52, the posture angle calculation unit 53, a first integrator 55, and a second integrator 56.

The posture angle calculation unit 53 calculates rotational angle components (θx, θy, θz) from the angular velocity components (ω-x, ω-y, ω-z) in the local coordinate system, which are output from the angular velocity sensor element 30, and outputs the rotational angle components (θx, θy, θz) to the coordinate rotation unit 52 and the output signal generation unit 58. In the posture angle calculation unit 53, a posture calculating method generally used in the field of inertial navigation is employed.

The coordinate rotation unit 52 calculates acceleration components (aX, aY, aZ) in the global coordinate system from the respective rotational components (θx, θy, θz) input from the posture angle calculation unit 53 and the dynamic acceleration component signals (Acc-x, Acc-y, Acc-z) in the local coordinate system.

The first integrator 55 performs time integration on the acceleration components (aX, aY, aZ) in the global coordinate system for the respective axes on the basis of the point-of-time information given by the point-of-time information acquisition unit 54, and extracts velocity components (vX, vY, vZ). The second integrator 56 performs time integration on the velocity components (vX, vY, vZ) for the respective axes on the basis of the point-of-time information acquired and given by the point-of-time information acquisition unit 54, and extracts position components (pX, pY, pZ) as the kinematic physical quantity.

The transmission/reception unit 101 includes a communication circuit and an antenna, for example, and constitutes an interface for communicating with the terminal device 1B (transmission/reception unit 404). The transmission/reception unit 101 is configured to be capable of transmitting an output signal including the trajectory image signal (control signal) S0 generated in the controller unit 50 to the terminal device 1B. Further, the transmission/reception unit 101 is configured to be capable of receiving setting information of the controller unit 50, which is transmitted from the terminal device 1B, and the like.

The communication performed between the transmission/reception unit 101 and the transmission/reception unit 404 of the terminal device 1B may be wireless or wired. The wireless communication may be communication using an electromagnetic wave (including infrared rays) or communication using an electric field. For a specific method, a communication method using a band ranging from several hundreds of MHz (megahertz) to several GHz (gigahertz), such as "Wi-Fi (registered trademark)", "Zigbee (registered trademark)", "Bluetooth (registered trademark)", "Bluetooth Low Energy", "ANT (registered trademark)", "ANT+ (registered trademark)", or "EnOcean (registered trademark)", can be exemplified. Proximity wireless communication such as NFC (Near Field Communication) may also be used.

The internal power supply 102 supplies power necessary to drive the sensor device 1A. For the internal power supply 102, a power storage element such as a primary battery or a secondary battery may be used. Alternatively, an energy harvesting technique including a power-generating element for vibration power generation, solar power generation, or the like and parasitic means may be used. In particular, in this embodiment, since the detection target having a motion is a measurement target, an energy harvesting device such as a vibration power generation device is suitable for the internal power supply 102.

The memory 103 includes a ROM (Read Only Memory), a RAM (Random Access Memory), and the like and stores programs for executing control of the sensor device 1A by the controller unit 50, such as a program for generating the trajectory image signal (control signal) S0 from the velocity-related information Vo, various parameters, or data.

(Terminal Device)

The terminal device 1B is typically constituted of a portable information terminal and includes a CPU 401, a memory 402, an internal power supply 403, the transmission/reception unit 404, a camera 405, a position information acquisition unit (GPS (Global Positioning System) device) 406, and the display unit 407.

The CPU 401 controls the entire operation of the terminal device 1B. The memory 402 includes a ROM, a RAM, and the like and stores programs for executing control of the terminal device 1B by the CPU 401, various parameters, or data. The internal power supply 403 is for supplying power necessary to drive the terminal device 1B and is typically constituted of a chargeable/dischargeable secondary battery.

The transmission/reception unit 404 includes a communication circuit capable of communicating with the transmission/reception unit 101 and an antenna. The transmission/reception unit 404 is further configured to be capable of communicating with another portable information terminal, a server, and the like by using wireless LAN or a 3G or 4G network N for mobile communication.

The display unit 407 is constituted of, for example, an LCD (Liquid Crystal Display) or an OLED (Organic Light Emitting Diode) and displays GUIs (Graphic User Interface) of various menus, applications, or the like. Typically, the display unit 407 includes a touch sensor and is configured to be capable of inputting predetermined setting information to the sensor device 1A via the CPU 401 and the transmission/reception unit 404 by a touch operation of the user.

An image of a trajectory of a motion of the user U is displayed on the display unit 407 on the basis of the trajectory image signal (control signal) S0 from the sensor device 1A, which is received via the transmission/reception unit 404.

[Configuration of Detector Unit]

Figure 5:
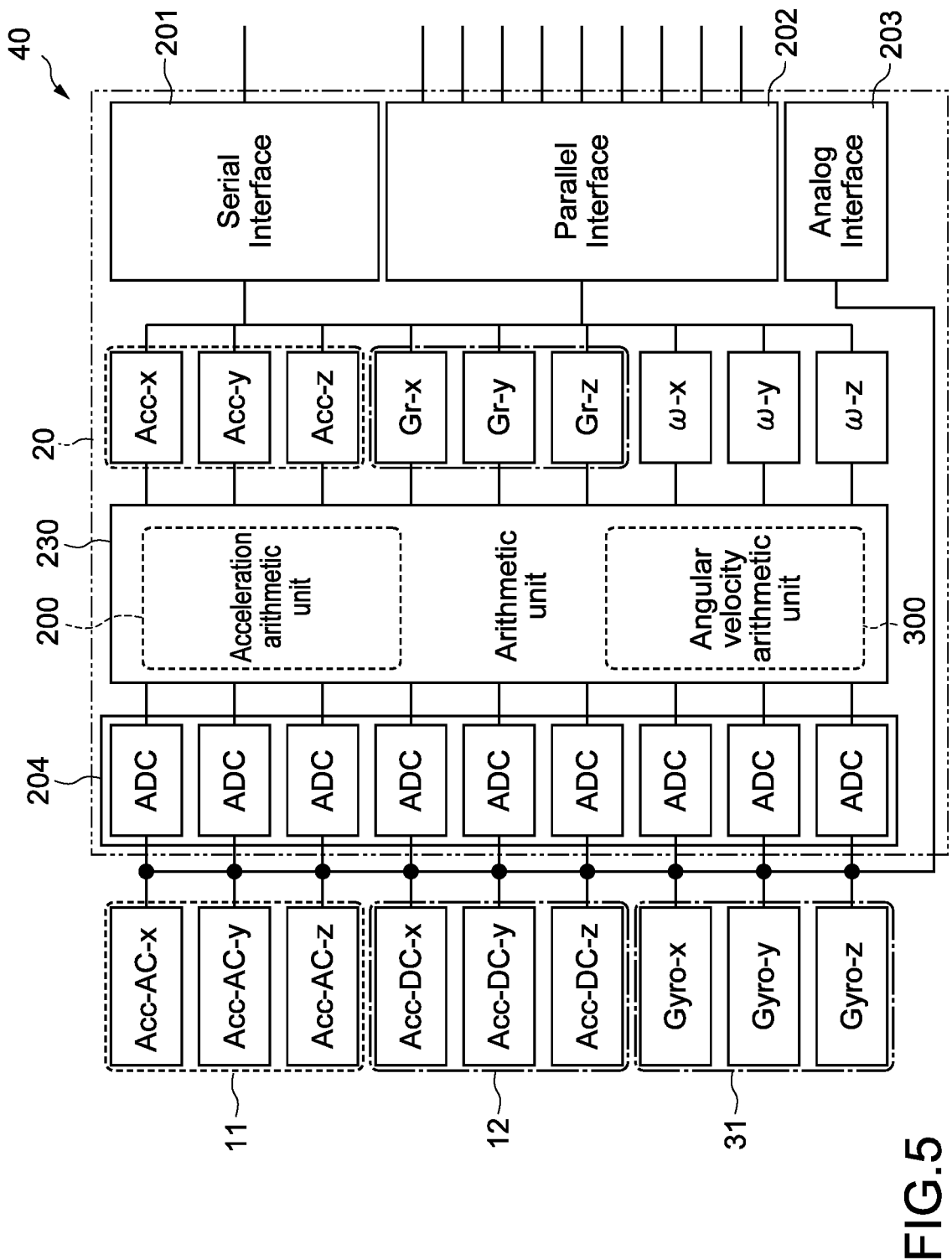
FIG. 5 is a circuit diagram showing a configuration example of an acceleration arithmetic unit in an inertial sensor provided in the motion measurement apparatus.

Next, details of the detector unit (inertial sensor) 40 according to this embodiment will be described. FIG. 5 is a block diagram showing a configuration of the detector unit (inertial sensor) 40 according to an embodiment of the present technology.

As shown in FIG. 4, the detector unit (inertial sensor) 40 includes the acceleration sensor element 10, the angular velocity sensor element 30, and the controller 20. Here, the acceleration sensor element 10 and the controller 20 will be mainly described.

The acceleration sensor element 10 of this embodiment is configured as an acceleration sensor that detects accelerations in three-axis directions (x, y, and z axes) in the local coordinate system.

In particular, the acceleration sensor element 10 of this embodiment is configured to be capable of extracting dynamic acceleration components and static acceleration components from the respective accelerations in the three-axis directions described above.

Here, the dynamic acceleration component typically means an AC component of the acceleration described above and typically corresponds to a motion acceleration (translational acceleration, centrifugal acceleration, tangential acceleration, or the like) of the object described above. Meanwhile, the static acceleration component typically means a DC component of the acceleration described above and typically corresponds to a gravitational acceleration or an acceleration estimated as a gravitational acceleration.

As shown in FIG. 5, the acceleration sensor element 10 includes two types of acceleration detector units (first acceleration detector unit 11 and second acceleration detector unit 12) that each detect information related to the accelerations in the three-axis directions. The angular velocity sensor element 30 includes an angular velocity detector unit 31.

The first acceleration detector unit 11 is a piezoelectric acceleration sensor and outputs each of a signal (Acc-AC-x) including information associated with an acceleration parallel to the x-axis direction, a signal (Acc-AC-y) including information associated with an acceleration parallel to the y-axis direction, and a signal (Acc-AC-z) including information associated with an acceleration parallel to the z-axis direction. Those signals (first detection signals) each have an alternating-current waveform corresponding to the acceleration of each axis.

Meanwhile, the second acceleration detector unit 12 is a non-piezoelectric acceleration sensor and outputs each of a signal (Acc-DC-x) including information associated with an acceleration parallel to the x-axis direction, a signal (Acc-DC-y) including information associated with an acceleration parallel to the y-axis direction, and a signal (Acc-DC-z) including information associated with an acceleration parallel to the z-axis direction. Those signals (second detection signals) each have an output waveform in which an alternating-current component corresponding to the acceleration of each axis is superimposed on a direct-current component.

The controller 20 includes an acceleration arithmetic unit 200 and an angular velocity arithmetic unit 300. The acceleration arithmetic unit 200 extracts dynamic acceleration components and static acceleration components from the respective accelerations in the three-axis directions described above on the basis of the output of the first acceleration detector unit 11 (first detection signals) and the output of the second acceleration detector unit 12 (second detection signals). The angular velocity arithmetic unit 300 calculates the angular velocity signals about the three axes ($\omega$-x, $\omega$-y, $\omega$-z) (third detection signals) on the basis of the angular velocity detection signals about the three axes (Gyro-x, Gyro-y, Gyro-z), respectively.

It should be noted that the controller 20 may be achieved by hardware elements such as a CPU (Central Processing Unit), a RAM (Random Access Memory), and a ROM (Read Only Memory) used in a computer and necessary software. Instead of or in addition to the CPU, a PLD (Programmable Logic Device) such as a FPGA (Field Programmable Gate Array), a DSP (Digital Signal Processor), or the like may be used.

(Acceleration Sensor Element)

Subsequently, details of the acceleration sensor element 10 constituting the detector unit (inertial sensor) 40 will be described.

Figure 6:
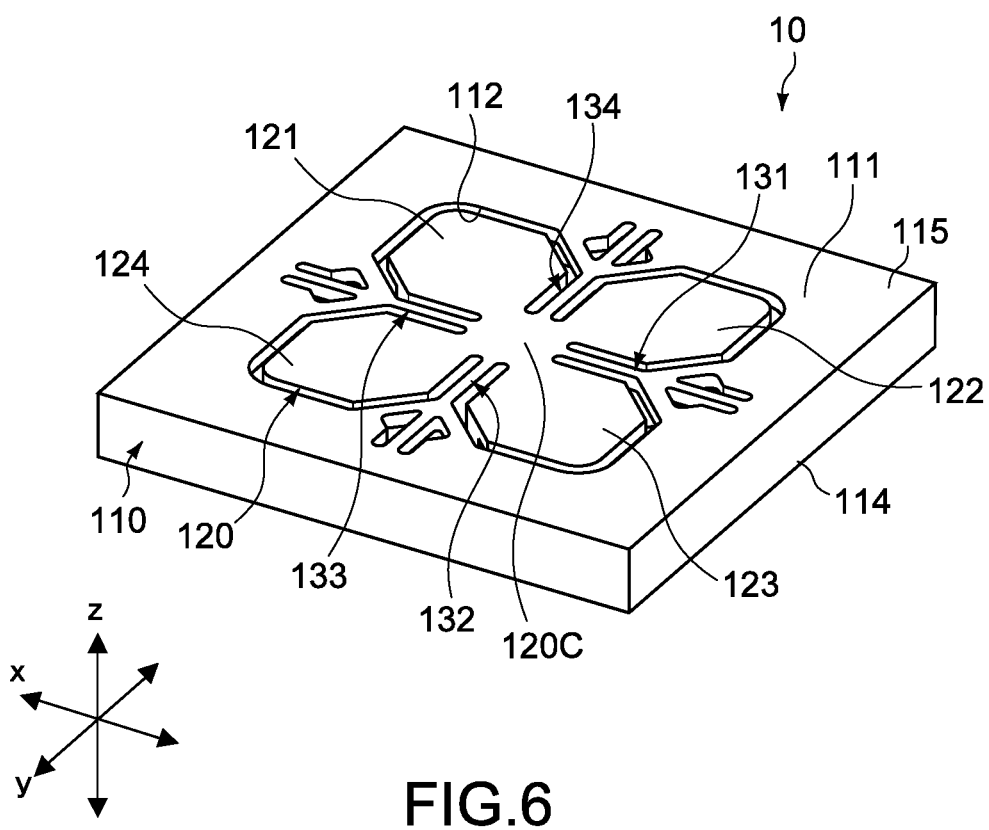
FIG. 6 is a schematic perspective view of the front surface side of an acceleration sensor element in the inertial sensor.
Figure 7:
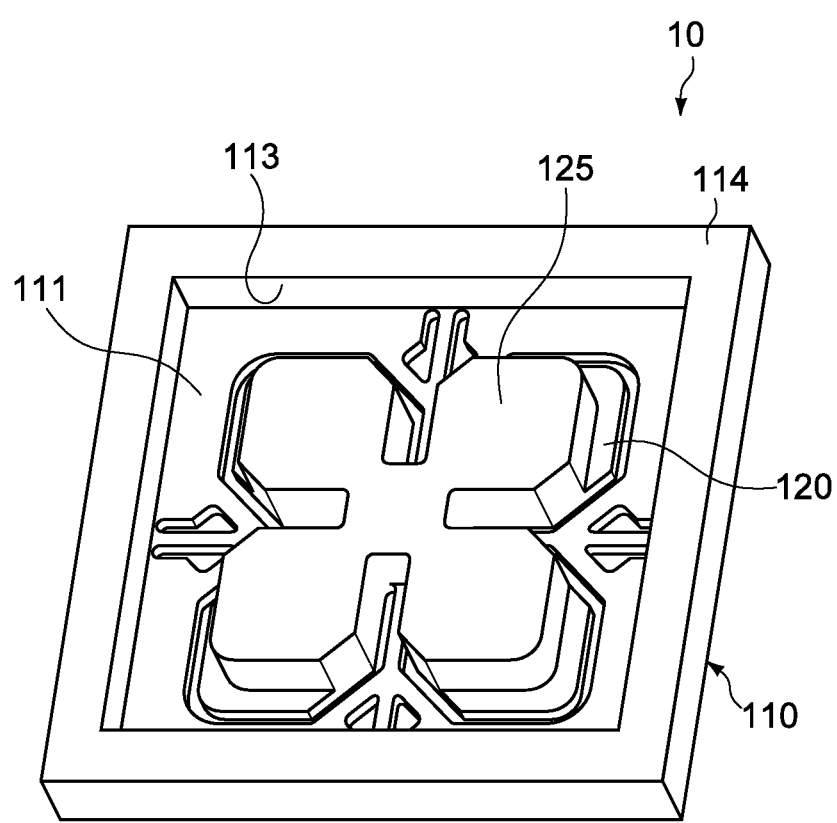
FIG. 7 is a schematic perspective view of the back surface side of the acceleration sensor element.
Figure 8:
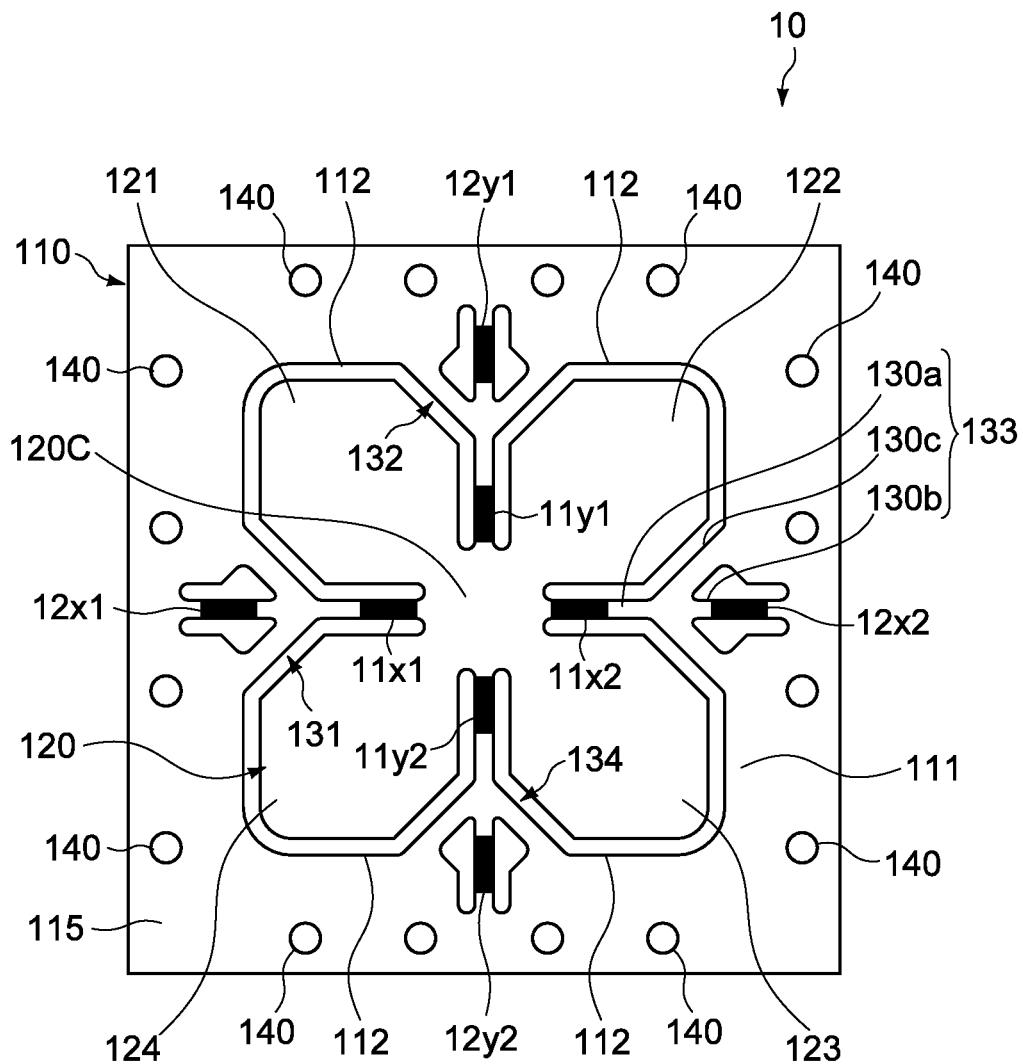
FIG. 8 is a plan view of the acceleration sensor element.

FIGS. 6 to 8 are a perspective view of the front surface side, a perspective view of the back surface side, and a plan view of the front surface side schematically showing the configuration of the acceleration sensor element 10, respectively.

The acceleration sensor element 10 includes an element main body 110, the first acceleration detector unit 11 (first detection elements 11$x$1, 11$x$2, 11$y$1, 11$y$2) and the second acceleration detector unit 12 (second detection elements 12$x$1, 12$x$2, 12$y$1, 12$y$2).

The element main body 110 includes a main surface portion 111 parallel to the xy plane and a support portion 114 on the opposite side. The element main body 110 is typically constituted of an SOI (Silicon On Insulator) substrate and has a laminated structure including an active layer (silicon substrate), which forms the main surface portion 111, and a frame-shaped support layer (silicon substrate), which forms the support portion 114. The main surface portion 111 and the support portion 114 have thicknesses different from each other, and the support portion 114 is formed to be thicker than the main surface portion 111.

The element main body 110 includes a movable plate 120 (movable portion) capable of moving by reception of an acceleration. The movable plate 120 is provided at the center portion of the main surface portion 111 and is formed by processing the active layer forming the main surface portion 111 into a predetermined shape. More specifically, the movable plate 120 including a plurality of (four in this example) blade portions 121 to 124 each having the shape symmetric with respect to the center portion of the main surface portion 111 is constituted by a plurality of groove portions 112 formed in the main surface portion 111. The circumferential portion of the main surface portion 111 constitutes a base portion 115 that faces the support portion 114 in the z-axis direction.

As shown in FIG. 7, the support portion 114 is formed into a frame including a rectangular recess portion 113 in which the back surface of the movable plate 120 is opened. The support portion 114 is constituted as a joint surface to be joined to a support substrate (not shown in the figure). The support substrate may be constituted of a circuit board that electrically connects the sensor element 10 and the controller 20 or may be constituted of a relay board or package board that is electrically connected to the circuit board. Alternatively, the support portion 114 may include a plurality of external connection terminals electrically connected to the circuit board, the relay board, or the like.

The blade portions 121 to 124 of the movable plate 120 are each constituted of a piece of board having a predetermined shape (substantially hexagonal shape in this example) and are disposed at intervals of 90° about the center axis parallel to the z axis. The thickness of each of the blade portions 121 to 124 corresponds to the thickness of the above-mentioned active layer constituting the main surface portion 111. The blade portions 121 to 124 are mutually integrally connected at the center portion 120C of the movable plate 120 and are integrated and supported so as to be relatively movable to the base portion 115.

As shown in FIG. 7, the movable plate 120 further includes a weight portion 125. The weight portion 125 is integrally provided to the back surface of the center portion of the movable plate 120 and the back surfaces of the respective blade portions 121 to 124. The size, the thickness, and the like of the weight portion 125 are not particularly limited and are set to have an appropriate size with which desired vibration properties of the movable plate 120 are acquired. The weight portion 125 is formed by, for example, processing the supporting layer forming the support portion 114 into a predetermined shape.

As shown in FIGS. 6 and 8, the movable plate 120 is connected to the base portion 115 via a plurality of (four in this example) bridge portions 131 to 134. The plurality of bridge portions 131 to 134 are each provided between the blade portions 121 to 124 and are formed by processing the active layer forming the main surface portion 111 into a predetermined shape. The bridge portion 131 and the bridge portion 133 are disposed to face each other in the x-axis direction, and the bridge portion 132 and the bridge portion 134 are disposed to face each other in the y-axis direction.

The bridge portions 131 to 134 constitute a part of the movable portion relatively movable to the base portion 115 and elastically support the center portion 120C of the movable plate 120. The bridge portions 131 to 134 each have an identical configuration and each includes, as shown in FIG. 8, a first beam portion 130a, a second beam portion 130b, and a third beam portion 130c.

The first beam portion 130a linearly extends from the circumferential portion of the center portion 120C of the movable plate 120 to each of the x-axis direction and the y-axis direction and is disposed between corresponding two of the blade portions 121 to 124 adjacent to each other. The second beam portion 130b linearly extends in each of the x-axis direction and the y-axis direction and couples the first beam portion 130a and the base portion 115 to each other.

The third beam portion 130c linearly extends in each of directions respectively intersecting with the x-axis direction and the y-axis direction and couples the intermediate portion between the first beam portion 130a and the second beam portion 130b and the base portion 115 to each other. Each of the bridge portions 131 to 134 includes two third beam portions 130c and is configured such that the two third beam portions 130c sandwich the single second beam portion 130b therebetween in the xy plane.

The rigidity of the bridging portions 131 to 134 is set to have an appropriate value at which the movable plate 120 that is moving can be stably supported. In particular, the bridging portions 131 to 134 are set to have appropriate rigidity at which the bridging portions 131 to 134 can be deformed by the self-weight of the movable plate 120. The magnitude of the deformation is not particularly limited as long as it can be detected by the second acceleration detector unit 12 to be described later.

As described above, the movable plate 120 is supported to the base portion 115 of the element main body 110 via the four bridge portions 131 to 134 and is configured to be capable of moving (movable) relative to the base portion 115 by an inertial force corresponding to the acceleration with the bridge portions 131 to 134 being set as a fulcrum.

Figure 9A:
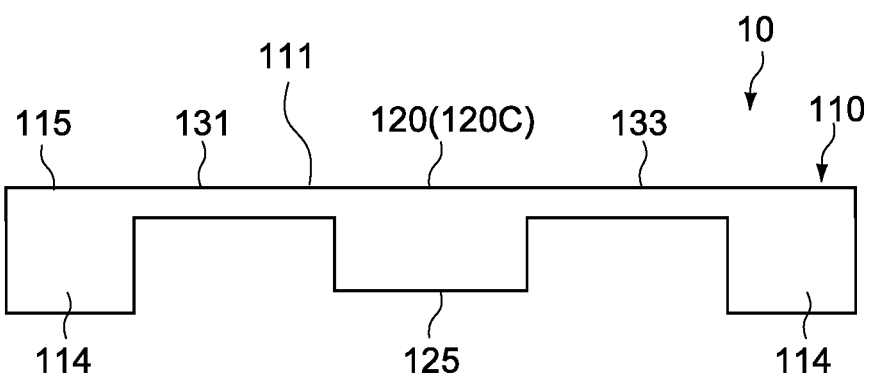
FIG. 9A is a schematic sectional side view for describing a state of a motion of a main part of the sensor element, which shows a state where accelerations are not applied.
Figure 9B:
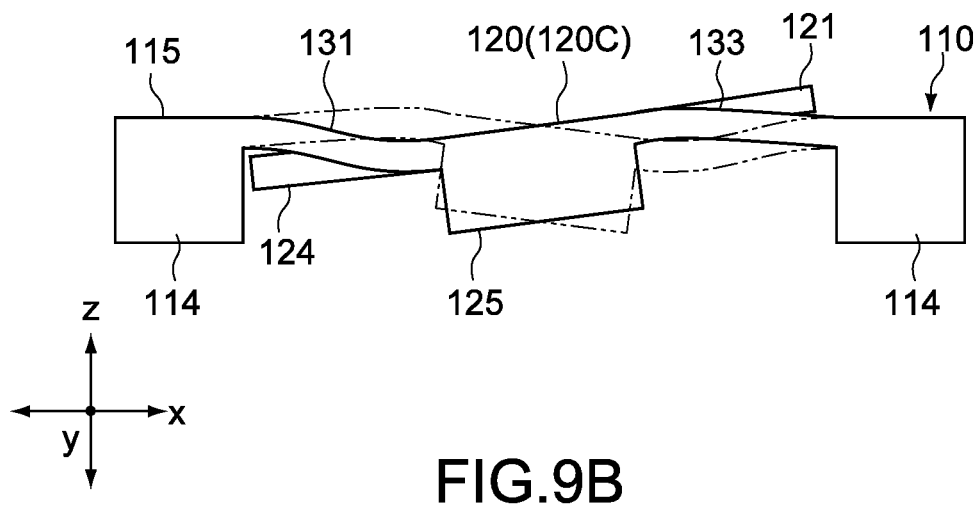
FIG. 9B is a schematic sectional side view for describing a state of a motion of the main part of the sensor element, which shows a state where an acceleration along an x-axis direction occurs.
Figure 9C:
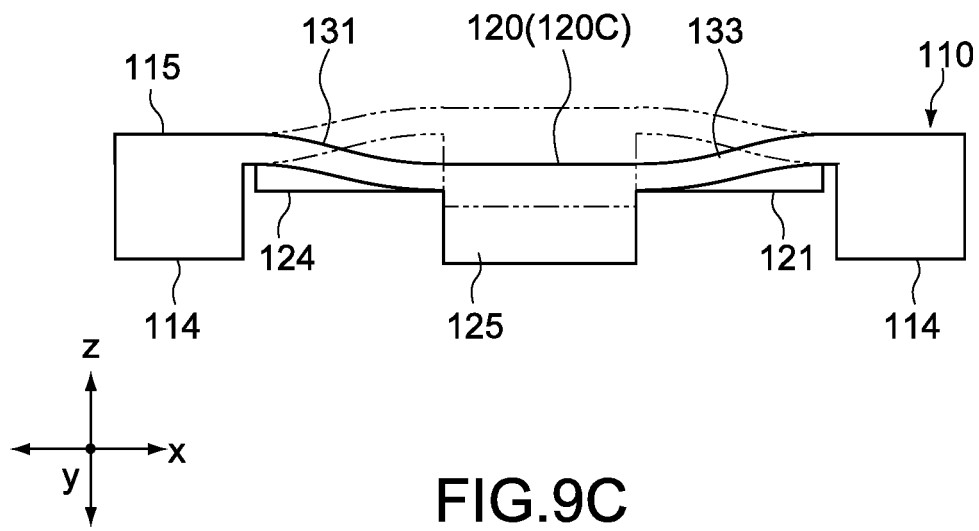
FIG. 9C is a schematic sectional side view for describing a state of a motion of the main part of the sensor element, which shows a state where an acceleration along a z-axis direction occurs.

FIGS. 9A to 9C are schematic sectional side views for describing a state of a motion of the movable plate 120, in which A shows a state where accelerations are not applied, B shows a state where the acceleration along the x-axis direction occurs, and C shows a state where the acceleration along the z-axis direction occurs. It should be noted that the solid line in FIG. 9B shows a state where the acceleration occurs in the left direction on the plane of the figure, and the solid line in FIG. 9C shows a state where the acceleration occurs in the upper direction on the plane of the figure.

When accelerations do not occur, as shown in FIGS. 6 and 9A, the movable plate 120 is maintained in a state parallel to the surface of the base portion 115. In this state, for example, when the acceleration along the x-axis direction occurs, as shown in FIG. 9B, the movable plate 120 tilts in the counterclockwise direction about the bridge portions 132 and 134 extending in the y-axis direction. With this configuration, the bridge portions 131 and 133 facing each other in the x-axis direction each receive bending stress in the directions opposite to each other along the z-axis direction.

Similarly, when the acceleration along the y-axis direction occurs, though not shown in the figure, the movable plate 120 tilts in the counterclockwise direction (or clockwise direction) about the bridge portions 131 and 133 extending in the x-axis direction. The bridge portions 132 and 134 facing each other in the y-axis direction each receive bending stress in the directions opposite to each other along the z-axis direction.

Meanwhile, when the acceleration along the z-axis direction occurs, as shown in FIG. 9C, the movable plate 120 rises and falls with respect to the base portion 115, and the bridge portions 131 to 134 each receive bending stress in an identical direction along the z-axis direction.

The first acceleration detector unit 11 and the second acceleration detector unit 12 are provided to each of the bridge portions 131 to 134. The detector unit (inertial sensor) 40 detects the deformation resulting from the bending stress of the bridge portions 131 to 134 by the acceleration detector units 11 and 12, and thus measures the direction and magnitude of the acceleration that acts on the sensor element 10.

Hereinafter, details of the acceleration detector units 11 and 12 will be described.

As shown in FIG. 8, the first acceleration detector unit 11 includes a plurality of (four in this example) first detection elements 11x1, 11x2, 11y1, and 11y2.

The detection elements 11x1 and 11x2 are provided on the axial centers of the respective surfaces of the two bridge portions 131 and 133 facing each other in the x-axis direction. One detection element 11x1 is disposed in the first beam portion 130a of the bridge portion 131, and the other detection element 11x2 is disposed in the first beam portion 130a of the bridge portion 133. In contrast to this, the detection elements 11y1 and 11y2 are provided on the axial centers of the respective surfaces of the two bridge portions 132 and 134 facing each other in the y-axis direction. One detection element 11y1 is disposed in the first beam portion 130a of the bridge portion 132, and the other detection element 11y2 is disposed in the first beam portion 130a of the bridge portion 134.

The first detection elements 11x1 to 11y2 each have an identical configuration and, in this embodiment, are each constituted of a rectangular piezoelectric detection element having a long side in the axial direction of the first beam portion 130a. The first detection elements 11x1 to 11y2 are each constituted of a laminate including a lower electrode layer, a piezoelectric film, and an upper electrode layer.

The piezoelectric film is typically made of piezoelectric zirconate titanate (PZT), but the present technology is not limited thereto as a matter of course. The piezoelectric film causes a potential difference, which corresponds to the amount of bending deformation (stress) of the first beam portion 130a in the z-axis direction, between the upper electrode layer and the lower electrode layer (piezoelectric effect). The upper electrode layer is electrically connected to each of the relay terminals 140 provided to the surface of the base portion 115 via a wiring layer (not shown in the figure) formed on the bridge portions 131 to 134. The relay terminal 140 may be configured as an external connection terminal electrically connected to the support substrate described above. For example, a bonding wire, one terminal of which is connected to the support substrate described above, is connected to the relay terminal 140 at the other terminal thereof. The lower electrode layer is typically connected to a reference potential such as a ground potential.

Since the first acceleration detector unit 11 configured as described above performs output only when the stress changes because of the characteristics of the piezoelectric film, and does not perform output in a state where a stress value is not changed even if the stress is applied, the first acceleration detector unit 11 mainly detects the magnitude of the motion acceleration that acts on the movable plate 120. Therefore, the output of the first acceleration detector unit 11 (first detection signal) mainly includes an output signal having an alternating-current waveform that is a dynamic component (AC component) corresponding to the motion acceleration.

Meanwhile, as shown in FIG. 8, the second acceleration detector unit 12 includes a plurality of (four in this example) second detection elements 12x1, 12x2, 12y1, and 12y2.

The detection elements 12x1 and 12x2 are provided on the axial centers of the respective surfaces of the two bridge portions 131 and 133 facing each other in the x-axis direction. One detection element 12x1 is disposed in the second beam portion 130b of the bridge portion 131, and the other detection element 12x2 is disposed in the second beam portion 130b of the bridge portion 133. In contrast to this, the detection elements 12y1 and 12y2 are provided on the axial centers of the respective surfaces of the two bridge portions 132 and 134 facing each other in the y-axis direction. One detection element 12y1 is disposed in the second beam portion 130b of the bridge portion 132, and the other detection element 12y2 is disposed in the second beam portion 130b of the bridge portion 134.

The second detection elements 12x1 to 12y2 each have an identical configuration and, in this embodiment, are each constituted of a piezoresistive detection element having a long side in the axial direction of the second beam portion 130b. The second detection elements 12x1 to 12y2 each include a resistive layer and a pair of terminal portions connected to both ends of the resistive layer in the axial direction.

The resistive layer is a conductor layer that is formed by, for example, doping an impurity element in the surface (silicon layer) of the second beam portion 130b, and causes a resistance change, which corresponds to the amount of bending deformation (stress) of the second beam portion 130b in the z-axis direction, between the pair of terminal portions (piezoresistive effect). The pair of terminal portions is electrically connected to each of the relay terminals 140 provided to the surface of the base portion 115 via a wiring layer (not shown in the figure) formed on the bridge portions 131 to 134.

Since the second acceleration detector unit 12 configured as described above has a resistance value determined by an absolute stress value because of the piezoresistive characteristics, the second acceleration detector unit 12 detects not only the motion acceleration that acts on the movable plate 120 but also the gravitational acceleration that acts on the movable plate 120. Therefore, the output of the second acceleration detector unit 11 (second detection signal) has an output waveform in which a dynamic component (AC component) corresponding to the motion acceleration is superimposed on a gravitational acceleration or a static component (DC component) corresponding to the gravitational acceleration.

It should be noted that the second detection elements 12x1 to 12y2 are not limited to the example in which the second detection elements 12x1 to 12y2 are each constituted of the piezoresistive detection element, and may be each constituted of other non-piezoelectric detection element capable of detecting the acceleration of the DC component, for example, like an electrostatic type. In a case of the electrostatic type, a movable electrode portion and a fixed electrode portion constituting an electrode pair are disposed to face each other in the axial direction of the second beam portion 130b and are configured such that a facing distance between the electrode portions changes depending on the amount of bending deformation of the second beam portion 130b.

The first acceleration detector unit 11 outputs each of the acceleration detection signals in the respective x-axis direction, y-axis direction, and z-axis direction (Acc-AC-x, Acc-AC-y, Acc-AC-z) to the controller 20 on the basis of the outputs of the first detection elements 11x1 to 11y2 (see FIG. 5).

The acceleration detection signal in the x-axis direction (Acc-AC-x) corresponds to a difference signal (ax1−ax2) between the output of the detection element 11x1 (ax1) and the output of the detection element 11x2 (ax2). The acceleration detection signal in the y-axis direction (Acc-AC-y) corresponds to a difference signal (ay1−ay2) between the output of the detection element 11y1 (ay1) and the output of the detection element 11y2 (ay2). Additionally, the acceleration detection signal in the z-axis direction (Acc-AC-z) corresponds to the sum of the outputs of the detection elements 11x1 to 11y2 (ax1+ax2+ay1+ay2).

Similarly, the second acceleration detector unit 12 outputs each of the acceleration detection signals in the respective x-axis direction, y-axis direction, and z-axis direction (Acc-DC-x, Acc-DC-y, Acc-DC-z) to the controller 20 on the basis of the outputs of the second detection elements 12x1 to 12y2 (see FIG. 5).

The acceleration detection signal in the x-axis direction (Acc-DC-x) corresponds to a difference signal (bx1−bx2) between the output of the detection element 12x1 (bx1) and the output of the detection element 12x2 (bx2). The acceleration detection signal in the y-axis direction (Acc-DC-y) corresponds to a difference signal (by1−by2) between the output of the detection element 12y1 (by1) and the output of the detection element 12y2 (by2). Additionally, the acceleration detection signal in the z-axis direction (Acc-DC-z) corresponds to the sum of the outputs of the detection elements 12x1 to 12y2 (bx1+bx2+by1+by2).

The arithmetic processing of the acceleration detection signals in the respective axial directions described above may be executed at a previous stage of the controller unit 50 or may be executed in the controller unit 50.

(Controller)

Subsequently, the controller (signal processing circuit) 20 will be described.

The controller 20 is electrically connected to the acceleration sensor element 10. The controller 20 may be mounted inside a device together with the acceleration sensor element 10 or may be mounted in an external device different from the above-mentioned device. In the former case, for example, the controller 20 may be mounted on a circuit board on which the acceleration sensor element 10 is to be mounted or may be mounted on a substrate different from the above-mentioned circuit board via a wiring cable or the like. In the latter case, for example, the controller 20 is configured to be communicable with the acceleration sensor element 10 wirelessly or wiredly.

The controller 20 includes the acceleration arithmetic unit 200, the angular velocity arithmetic unit 300, a serial interface 201, a parallel interface 202, and an analog interface 203. The controller 20 is electrically connected to controller units of various devices that receive the output of the detector unit (inertial sensor) 40.

The acceleration arithmetic unit 200 extracts each of dynamic acceleration components (Acc-x, Acc-y, Acc-z) and static acceleration components (Gr-x, Gr-y, Gr-z) on the basis of the acceleration detection signals in the respective axial directions, which are output from the first acceleration detector unit 11 and the second acceleration detector unit 12.

It should be noted that the acceleration arithmetic unit 200 is achieved by loading a program, which is recorded in a ROM as an example of a non-transitory computer readable recording medium, to a RAM or the like and executing the program by the CPU.

The angular velocity arithmetic unit 300 calculates angular velocity signals about the three axes (ω-x, ω-y, ω-z) on the basis of the angular velocity detection signals about the three axes (Gyro-x, Gyro-y, Gyro-z), respectively, and outputs those signals to the outside via the serial interface 201, the parallel interface 202, or the analog interface 203. The angular velocity arithmetic unit 300 may be constituted separately from the acceleration arithmetic unit 200 or may be constituted of the arithmetic unit 230 in common with the acceleration arithmetic unit 200.

The serial interface 201 is configured to be capable of sequentially outputting the dynamic and static acceleration components in the respective axes, which are generated in the acceleration arithmetic unit 200, and the angular velocity signals in the respective axes, which are generated in the angular velocity arithmetic unit 300, to the controller units described above. The parallel interface 202 is configured to be capable of outputting the dynamic and static acceleration components in the respective axes, which are generated in the acceleration arithmetic unit 200, to the controller units described above in parallel. The controller 20 may include at least one of the serial interface 201 or the parallel interface 202 or may selectively switch the interface depending on commands from the controller units described above. The analog interface 203 is configured to be capable of outputting the outputs of the first and second acceleration detector units 11 and 12 to the controller units described above without change, but it may be omitted as necessary. It should be noted that FIG. 5 shows converters 204 that analog-digital (AD) convert the acceleration detection signals in the respective axes.

Figure 10:
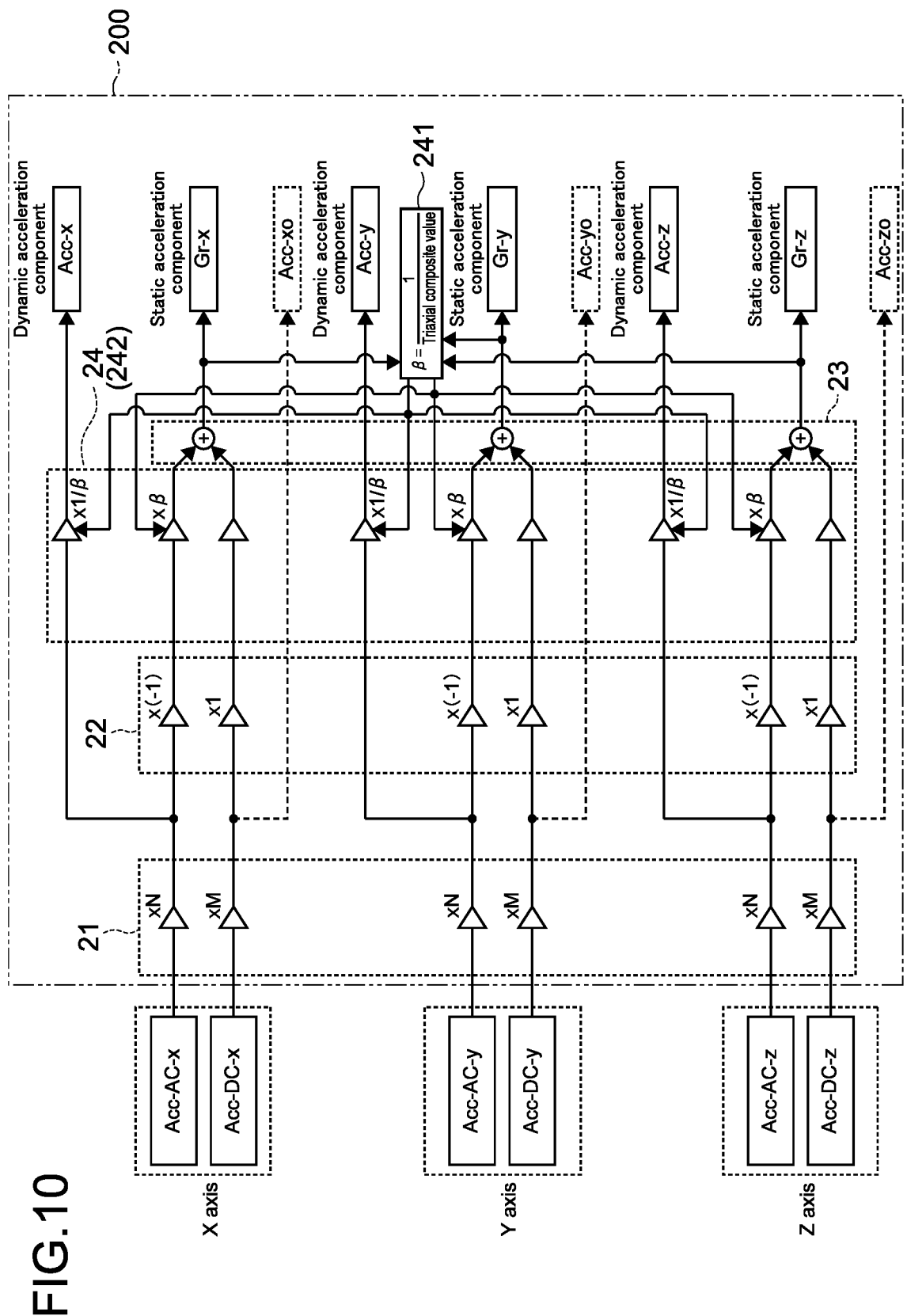
FIG. 10 is a circuit diagram showing a configuration example of the acceleration arithmetic unit in the inertial sensor.

FIG. 10 is a circuit diagram showing a configuration example of the acceleration arithmetic unit 200.

The acceleration arithmetic unit 200 includes a gain adjustment circuit 21, a sign inversion circuit 22, an adder circuit 23, and a correction circuit 24. Those circuits 21 to 24 have a common configuration for each of the x, y, and z axes. The arithmetic processing in common with the respective axes is performed, and the dynamic acceleration components (motion accelerations) and the static acceleration components (gravitational accelerations) in the respective axes are thus extracted.

Figure 11:
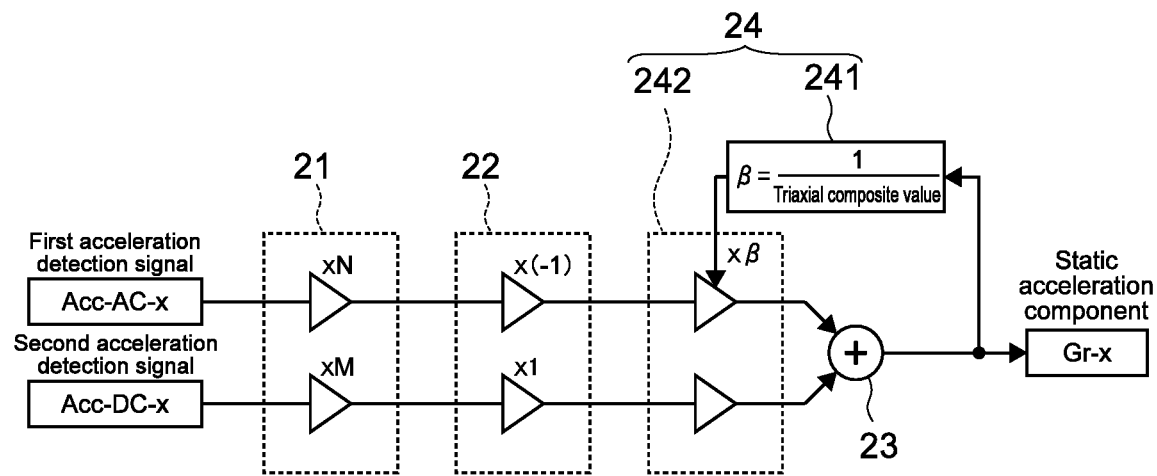
FIG. 11 is a diagram showing a processing block for a one-axis direction in the acceleration arithmetic unit.

Hereinafter, representatively, a processing circuit of the acceleration detection signal in the x-axis direction will be described as an example. FIG. 11 shows a processing block that extracts the static acceleration component from the acceleration detection signal in the x-axis direction.

The gain adjustment circuit 21 adjusts gain of each signal such that a first acceleration detection signal (Acc-AC-x) regarding the x-axis direction, which is output from the first acceleration detector unit 11 (11x1, 11x2), and a second acceleration detection signal (Acc-DC-x) regarding x-axis direction, which is output from the second acceleration detector unit 12 (12x1, 12x2), have a level identical to each other. The gain adjustment circuit 21 includes an amplifier that amplifies the output of the first acceleration detector unit 11 (Acc-AC-x) and the output of the second acceleration detector unit 12 (Acc-DC-x).

Figure 12:
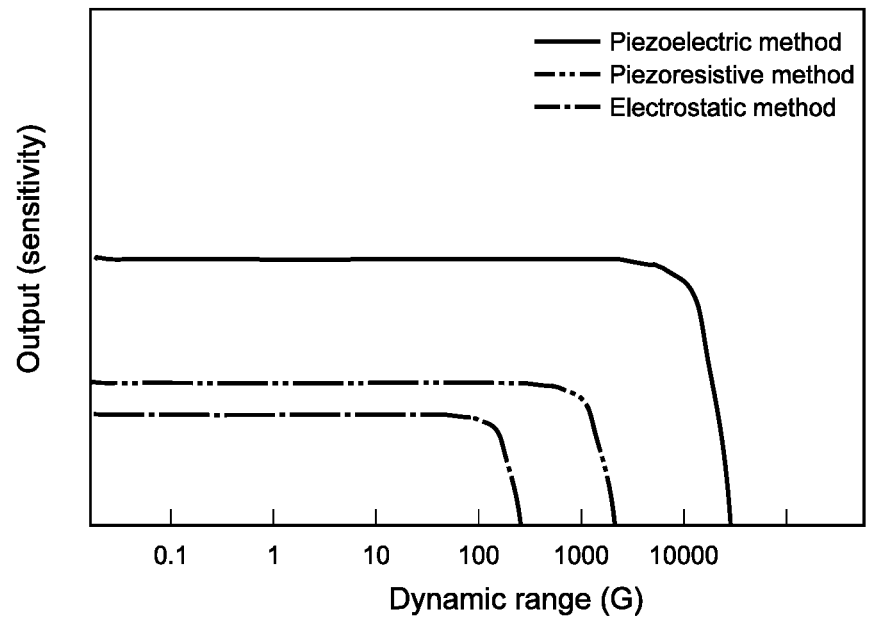
FIG. 12 is a diagram for describing output characteristics of a plurality of acceleration sensors in different detection methods.

In general, the output sensitivity and the dynamic range of an acceleration sensor are different depending on a detection method. For example, as shown in FIG. 12, an acceleration sensor in a piezoelectric method has higher output sensitivity and a wider (larger) dynamic range than those of acceleration sensors in a non-piezoelectric method (piezoresistive method, electrostatic method). In this embodiment, the first acceleration detector unit 11 corresponds to an acceleration sensor in a piezoelectric method, and the second acceleration detector unit 12 corresponds to an acceleration sensor in a piezoresistive method.

In this regard, the gain adjustment circuit 21 amplifies the outputs of the acceleration detector units 11 and 12 (first and second acceleration detection signals) by N times and M times, respectively, such that the outputs of those acceleration detector units 11 and 12 have the identical level. The amplification factors N and M are positive numbers and satisfy a relationship where N<M. The values of the amplification factors N and M are not particularly limited and may be set as coefficients that also serve for the temperature compensation of the respective acceleration detector units 11 and 12, depending on an environment of usage (service temperature) of the detector unit (inertial sensor) 40.

Figure 13:
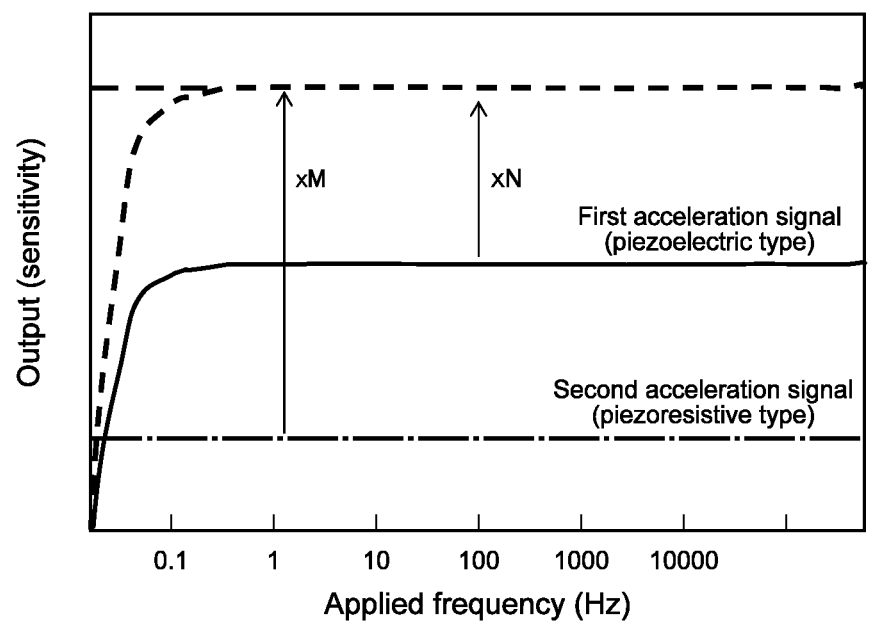
FIG. 13 is a diagram for describing an action of the acceleration arithmetic unit.

FIG. 13 shows an example of the output characteristics of the first acceleration detection signal and the second acceleration detection signal in comparison between the output characteristics before the gain adjustment and the output characteristics after the gain adjustment. In the figure, the horizontal axis represents the frequency of the acceleration that acts on the detector unit (inertial sensor) 40, and the vertical axis represents the output (sensitivity) (the same holds true for FIGS. 14 to 18).

As shown in the figure, in the first acceleration detection signal (Acc-AC-x) in the piezoelectric method, the output sensitivity of the acceleration components in the low-frequency range equal to or smaller than 0.5 Hz is lower than the output sensitivity of the acceleration components in the frequency range higher than the former range, and in particular, the output sensitivity in a static state (motion acceleration is zero) is substantially zero. In contrast to this, the second acceleration detection signal (Acc-DC-x) in the piezoresistive method has constant output sensitivity in the entire frequency range, and thus the acceleration component in the static state (i.e., static acceleration component) can also be detected at constant output sensitivity. Therefore, when the first acceleration detection signal and the second acceleration detection signal are amplified by respective predetermined multiplying factors in the gain adjustment circuit 21 so as to have a level identical to each other, the static acceleration component can be extracted in a difference arithmetic circuit to be described later.

The sign inversion circuit 22 and the adder circuit 23 constitute the difference arithmetic circuit that extracts the static acceleration component (DC component) from the acceleration in each axial direction on the basis of a difference signal between the first acceleration detection signal (Acc-AC-x) and the second acceleration detection signal (Acc-DC-x).

Figure 14:
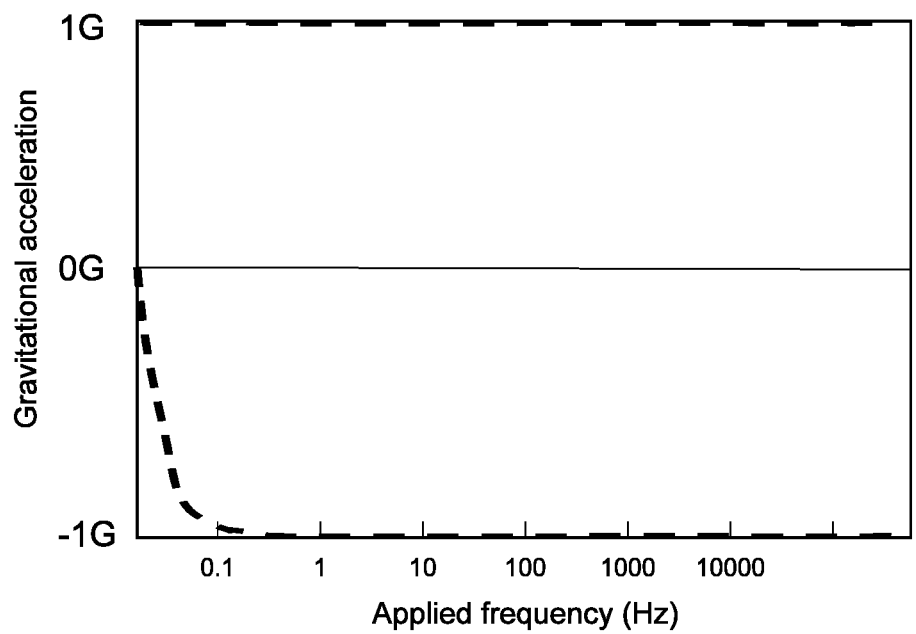
FIG. 14 is a diagram for describing an action of the acceleration arithmetic unit.

The sign inversion circuit 22 includes an inverting amplifier (amplification factor: −1) that inverts the sign of the first acceleration detection signal (Acc-AC-x) after the gain adjustment. FIG. 14 shows an example of the output characteristics of the first acceleration detection signal (Acc-AC-x) after the sign inversion. Here, a case where the sensor element 10 detects a 1G-acceleration in the x-axis direction is shown as an example.

It should be noted that the second acceleration detection signal (Acc-DC-x) is output to the adder circuit 23 as a subsequent stage, without inverting the sign thereof. The sign inversion circuit 22 may be configured in common with the gain adjustment circuit 21 at the previous stage thereof.

Figure 15:
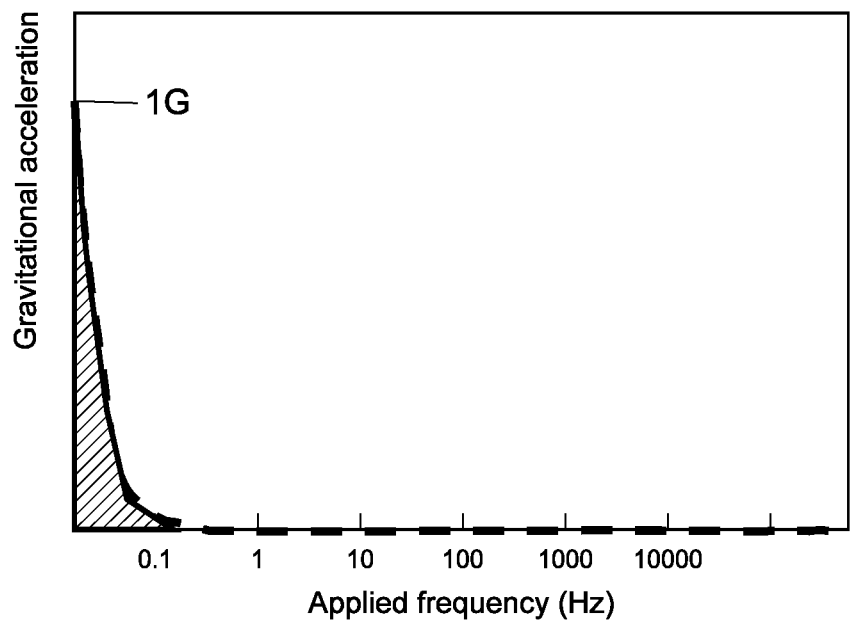
FIG. 15 is a diagram for describing an action of the acceleration arithmetic unit.

The adder circuit 23 adds the first acceleration detection signal (Acc-AC-x) and the second acceleration detection signal (Acc-DC-x), which are output from the sign inversion circuit 22, and outputs a static acceleration component. FIG. 15 shows an example of the output characteristics of the adder circuit 23. Since the first and second acceleration detection signals are adjusted to have the identical level in the gain adjustment circuit 21, when a difference signal between those signals is obtained, a net static acceleration component (Gr-x) is extracted. The static acceleration component typically corresponds to a gravitational acceleration component or an acceleration component including a gravitational acceleration.

Figure 16:
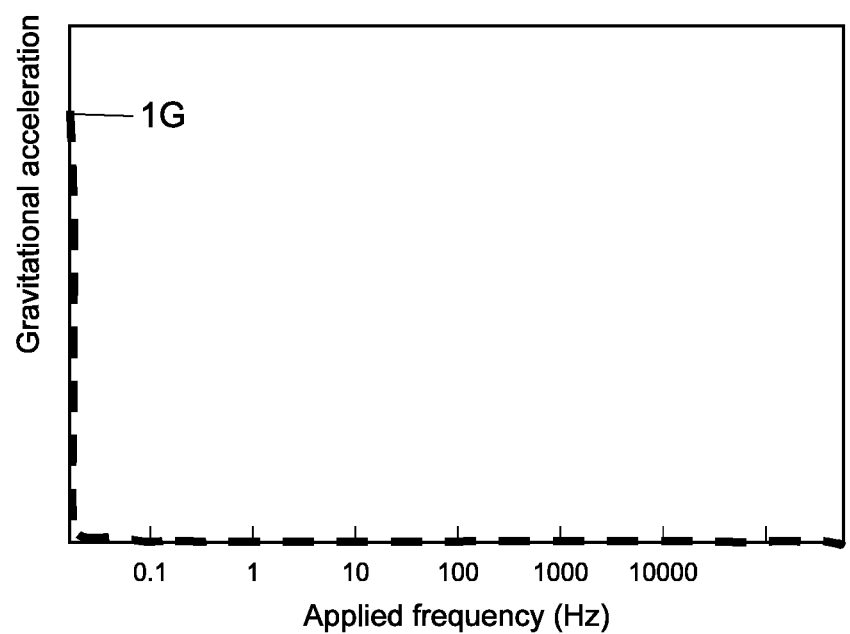
FIG. 16 is a diagram for describing an action of the acceleration arithmetic unit.

In a case where the static acceleration component output from the adder circuit 23 is only the gravitational acceleration, in theory, the output of a significant acceleration component appears only in the vicinity of 0 Hz as shown in FIG. 16. However, in reality, because of the low detection sensitivity in the vicinity of low frequencies of the piezoelectric-detection-type first acceleration detector unit 11, inevitable superimposition of acceleration components in axial directions (here, y-axis direction and z-axis direction) other than the target axis due to the occurrence of the sensitivity in the other axes, or the like, the dynamic acceleration component in the frequency range hatched in FIG. 15 leaks into the output of the adder circuit 23 as an error component. In this regard, this embodiment includes the correction circuit 24 for cancelling the error on the basis of the output of the adder circuit 23.

The correction circuit 24 includes a triaxial-composite-value arithmetic unit 241 and a low-frequency sensitivity correction unit 242. The correction circuit 24 calculates a correction coefficient β on the basis of the output of the adder circuit 23 (difference signal between first and second acceleration detection signals) and corrects the first acceleration detection signal (Acc-AC-x) by using the correction coefficient β.

The triaxial-composite-value arithmetic unit 241 is provided in common for the processing blocks that extract the static acceleration components in all the x-axis, y-axis, and z-axis directions, and calculates the correction coefficient β by using the total value of the outputs (difference signals between first and second acceleration detection signals) of the adder circuits 23 in the respective axes.

Specifically, the triaxial-composite-value arithmetic unit 241 calculates a composite value $(\sqrt{(Gr\text{-}x)^2+(Gr\text{-}y)^2+(Gr\text{-}z)^2})$ of the static acceleration components in the three-axis directions (Gr-x, Gr-y, Gr-z), and while considering a portion exceeding 1 in the composite value as a low-frequency sensitivity error (range hatched in FIG. 15), calculates the correction coefficient β corresponding to the inverse of the composite value described above.

$$\beta = 1/(\sqrt{((Gr\text{-}x)^2+(Gr\text{-}y)^2+(Gr\text{-}z)^2})$$

It should be noted that the values of the static acceleration components in the respective three-axis directions (Gr-x, Gr-y, Gr-z) differ depending on the posture of the acceleration sensor element 10 and further vary from hour to hour according to a change in posture of the acceleration sensor element 10. For example, in a case where the z-axis direction of the acceleration sensor element 10 coincides with the gravity direction (vertical direction), the static acceleration component (Gr-z) in the z-axis direction has the largest value as compared to the static acceleration components (Gr-x, Gr-y) in the x-axis direction and the y-axis direction. In such a manner, the gravity direction of the acceleration sensor element 10 at that point of time can be estimated from the values of the static acceleration components (Gr-x, Gr-y, Gr-z) in the respective three-axis directions.

The low-frequency sensitivity correction unit 242 includes a multiplier that multiplies the first acceleration detection signal (Acc-AC-x) having the inverted sign by the correction coefficient β. With this configuration, the first acceleration detection signal is input to the adder circuit 23 in a state where a low-frequency sensitivity error is reduced, and thus an acceleration signal having the frequency characteristics as shown in FIG. 16 is output from the adder circuit 23. In such a manner, only the static acceleration component corresponding to the gravitational acceleration is output, with the result that the extraction accuracy of the gravitational acceleration component is improved.

In this embodiment, the correction circuit 24 is configured to execute processing of multiplying the first acceleration detection signal by the correction coefficient β when the static acceleration component is calculated, but the present technology is not limited thereto. The correction circuit 24 may be configured to execute processing of multiplying the second acceleration detection signal (Acc-DC-x) by the correction coefficient β or may be configured to switch an acceleration detection signal to be corrected between the first acceleration detection signal and the second acceleration detection signal according to the magnitude of an acceleration change.

In a case where either one of the first acceleration detection signal and the second acceleration detection signal has a predetermined acceleration change or larger, the correction circuit 24 is configured to correct the first acceleration detection signal by using the correction coefficient β. As the acceleration change becomes larger (as a frequency to be applied becomes higher), a proportion at which the error component leaks into the first acceleration detection signal increases, and thus the error component can be effectively reduced. This configuration is particularly effective in a case where the motion acceleration is relatively large, for example, as in a motion analysis application.

Meanwhile, in a case where either one of the first acceleration detection signal and the second acceleration detection signal has a predetermined acceleration change or smaller, the correction circuit 24 is configured to correct the second acceleration detection signal by using the correction coefficient β. As the acceleration change becomes smaller (as a frequency to be applied becomes lower), a proportion at which the error component leaks into the second acceleration detection signal increases, and thus the error component can be effectively reduced. This configuration is particularly effective in a case where the motion acceleration is relatively small, for example, as in a leveling operation of a digital camera.

While the static acceleration components in the respective axial directions are extracted as described above, in order to extract the dynamic acceleration components in the respective axial directions (Acc-x, Acc-y, Acc-z), the first acceleration detection signals (Acc-AC-x, Acc-AC-y, Acc-AC-z), in each of which gain is adjusted in the gain adjustment circuit 21, are referred to as shown in FIG. 10.

Here, the first acceleration detection signal may be used to extract the dynamic acceleration component as it is. However, since there is a case where part of the dynamic acceleration component leaks into the static acceleration component as described above, the dynamic acceleration component is lost and the detection with high accuracy is difficult to perform. In this regard, the first acceleration detection signal is corrected by using the correction coefficient β calculated in the correction circuit 24, so that the detection accuracy of the dynamic acceleration component can be achieved.

Figure 17:
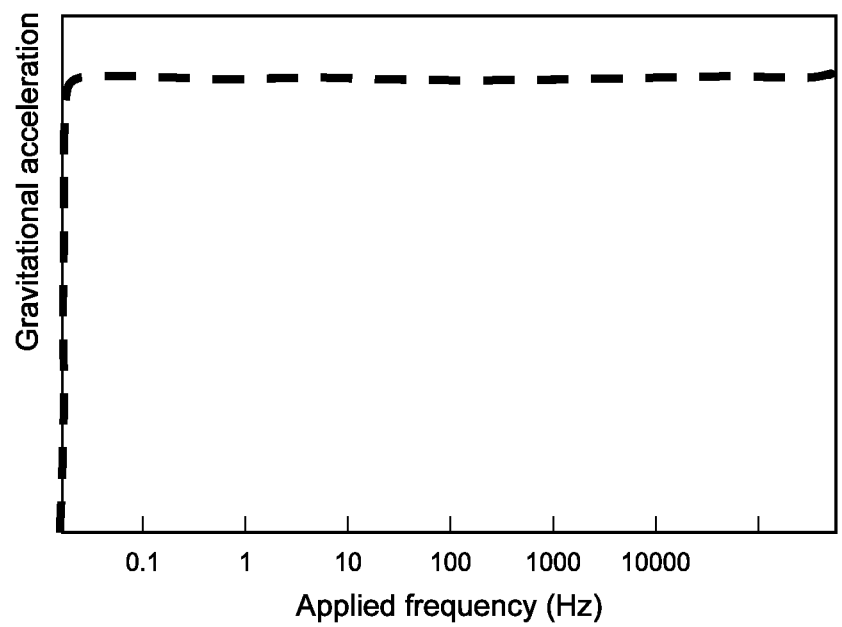
FIG. 17 is a diagram for describing an action of the acceleration arithmetic unit.
Figure 18:
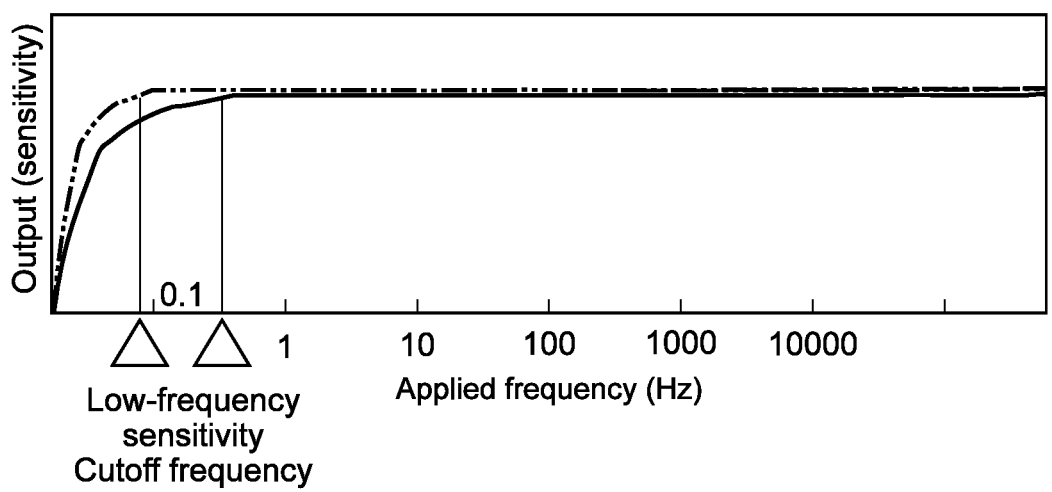
FIG. 18 is a diagram for describing an action of the acceleration arithmetic unit.

More specifically, as shown in FIG. 10, the correction circuit 24 (low-frequency sensitivity correction unit 242) includes a multiplier that multiplies the first acceleration signals (Acc-AC-x, Acc-AC-y, Acc-AC-z) by the inverse (1/β) of the correction coefficient β, which is acquired by the triaxial-composite-value arithmetic unit 241. With this configuration, low-frequency sensitivity components of the first acceleration signals are compensated, and thus the extraction accuracy of the dynamic acceleration components (Acc-x, Acc-y, Acc-z) is improved. FIG. 17 schematically shows the output characteristics of the dynamic acceleration components.

In this embodiment, the correction circuit 24 is configured to execute processing of multiplying the first acceleration detection signal by the inverse (1/β) of the correction coefficient when the dynamic acceleration component is calculated, but the present technology is not limited thereto. The correction circuit 24 may be configured to execute processing of multiplying the second acceleration detection signals (Acc-DC-x, Acc-DC-y, Acc-DC-z) by the inverse (1/β) of the correction coefficient. Alternatively, the correction circuit 24 may be configured to switch an acceleration detection signal to be corrected between the first acceleration detection signal and the second acceleration detection signal according to the magnitude of an acceleration change, as in the case of the above-mentioned calculation technique for the static acceleration components.

The processing of correcting the dynamic acceleration component and the static acceleration component by the low-frequency sensitivity correction unit 242 is typically effective in a case where a composite value calculated in the triaxial-composite-value arithmetic unit 241 is other than 1 G (G: gravitational acceleration). It should be noted that examples of the case where the composite value described above is less than 1 G include a case where the sensor element 10 is in free fall.

It should be noted that the first acceleration detection signal detected by the piezoelectric method has output characteristics like a high-pass filter (HPF), and the output lower than a cutoff frequency thereof remains in the output of the adder circuit 23 as an error component of the low-frequency sensitivity (see FIG. 15). In this embodiment, the error component described above is reduced by an arithmetic technique using the correction circuit 24, but the lower cutoff frequency described above is more desirable in order to enhance the accuracy of cancelling the error component.

In this regard, for example, a piezoelectric body having a relatively large capacitance and internal resistance may be used as the piezoelectric film of each of the detection elements (11x1, 11x2, 11y1, 11y2) constituting the first acceleration detector unit 11. With this configuration, for example, as indicated by a chain line in FIG. 18, the cutoff frequency of the low-frequency sensitivity can be reduced to the vicinity of 0 Hz as much as possible, so that the error component of the low-frequency sensitivity can be made as small as possible.

Next, the method of processing the acceleration signal in the acceleration arithmetic unit 200 configured as described above will be described.

When an acceleration acts on the acceleration sensor element 10, the movable plate 120 moves according to the direction of the acceleration with respect to the base portion 115 in the states shown in FIGS. 9A to 9C. The first acceleration detector unit 11 (detection elements 11x1, 11x2, 11y1, 11y2) and the second acceleration detector unit 12 (detection elements 12x1, 12x2, 12y1, 12y2) output detection signals corresponding to the amounts of mechanical deformation of the bridge portions 131 to 134 to the controller 20.

Figure 19:
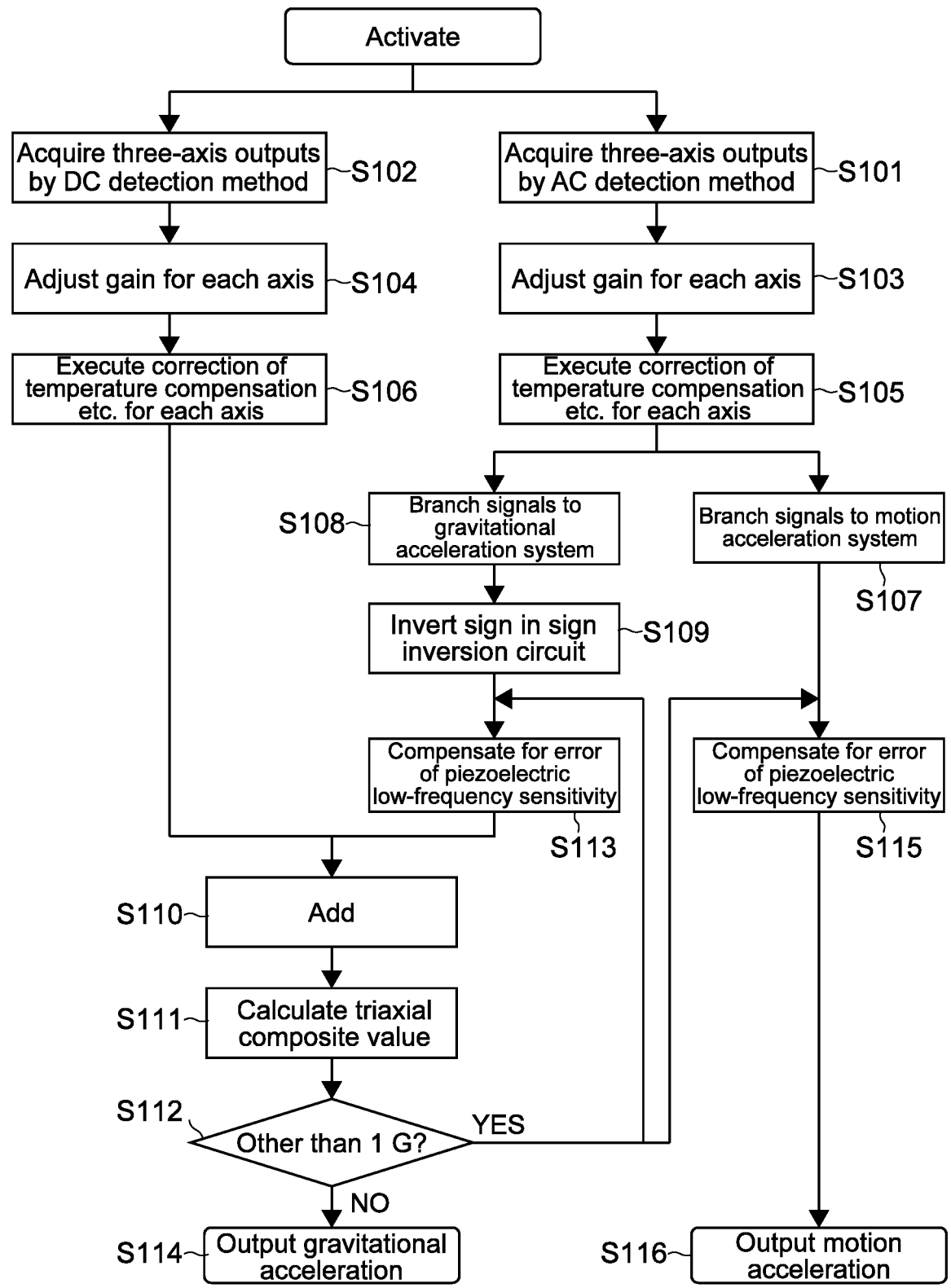
FIG. 19 is a flowchart showing an example of a processing procedure of the acceleration arithmetic unit.

FIG. 19 is a flowchart showing an example of the processing procedure of the acceleration detection signal in the controller 20 (acceleration arithmetic unit 200).

The controller 20 acquires the first acceleration detection signals in the respective axes (Acc-AC-x, Acc-AC-y, Acc-AC-z) from the first acceleration detector unit 11 and receives (acquires) the second acceleration detection signals in the respective axes (Acc-DC-x, Acc-DC-y, Acc-DC-z) from the second acceleration detector unit 12 at predetermined sampling intervals (Steps 101 and 102). Those detection signals may be acquired simultaneously (in parallel) or sequentially (serially).

Sequentially, the controller 20 adjusts gain of each detection signal by the gain adjustment circuit 21 such that the first and second acceleration detection signals have an identical level for each axis (FIG. 13, Steps 103 and 104). Further, as necessary, correction for the purpose of temperature compensation or the like of the first and second acceleration detection signals is performed for each axis (Steps 105 and 106).

Next, the controller 20 branches the first acceleration detection signals in the respective axes (Acc-AC-x, Acc-AC-y, Acc-AC-z) into a dynamic acceleration calculation system (motion acceleration system) and a static acceleration calculation system (gravitational acceleration system) (Steps 107 and 108). The first acceleration detection signal branched to the static acceleration calculation system is input to the adder circuit 23 after the sign thereof is inverted by the sign inversion circuit 22 (FIG. 14, Step 109).

The controller 20 adds the first acceleration detection signals (Acc-AC-x, Acc-AC-y, Acc-AC-z) whose signs are inverted, and the second acceleration detection signals (Acc-DC-x, Acc-DC-y, Acc-DC-z), and calculates static acceleration components (Gr-x, Gr-y, Gr-z) for the respective axes in the adder circuit 23 (FIG. 15, Step 110). Furthermore, the controller 20 calculates a triaxial composite value of those static acceleration components in the triaxial-composite-value arithmetic unit 241 (Step 111) and, in a case where that value is other than 1 G, executes in the low-frequency sensitivity correction unit 242 processing of multiplying the above-mentioned first acceleration detection signals (Acc-AC-x, Acc-AC-y, Acc-AC-z) whose signs are inverted, by the correction coefficient β that is the inverse of the composite value described above (Steps 112 and 113). When the composite value described above is 1 G, the controller 20 outputs the calculated gravitational acceleration components (static acceleration components) to the outside (Step 114). It should be noted that the present technology is not limited to the above, and each time the composite value described above is calculated, the calculated gravitational acceleration components (static acceleration components) may be output to the outside.

Meanwhile, when the composite value described above is other than 1 G, the controller 20 executes the processing of multiplying the first acceleration detection signals (Acc-AC-x, Acc-AC-y, Acc-AC-z), which are branched to the motion acceleration system, by the inverse (1/β) of the calculated correction coefficient β (Steps 112 and 115). When the composite value described above is 1 G, the controller 20 outputs the calculated motion acceleration components (dynamic acceleration components) to the outside (Step 116). It should be noted that the present technology is not limited to the above, and each time the composite value described above is calculated, the calculated motion acceleration components (dynamic acceleration components) may be output to the outside.

As described above, the detector unit (inertial sensor) 40 in this embodiment is configured to use the difference in detection methods for the first and second acceleration detector units 11 and 12 to extract the dynamic acceleration components and the static acceleration components from those outputs. With this configuration, the motion acceleration that acts on the user U as a detection target can be accurately measured.

Further, according to this embodiment, since the gravitational acceleration components can be accurately extracted from the output of the detector unit (inertial sensor) 40, the posture of the detection target with respect to the gravity direction can be highly accurately detected. With this configuration, for example, the horizontal posture of a detection target such as a flight vehicle can be stably maintained.

Furthermore, according to this embodiment, since a piezoelectric acceleration sensor is employed as the first acceleration detector unit 11, and a non-piezoelectric (piezoresistive or electrostatic) acceleration sensor is employed as the second acceleration detector unit 12, an inertial sensor having a wide dynamic range and high sensitivity in a low-frequency range can be obtained.

[Operation of Motion Measurement System]

Figure 20:
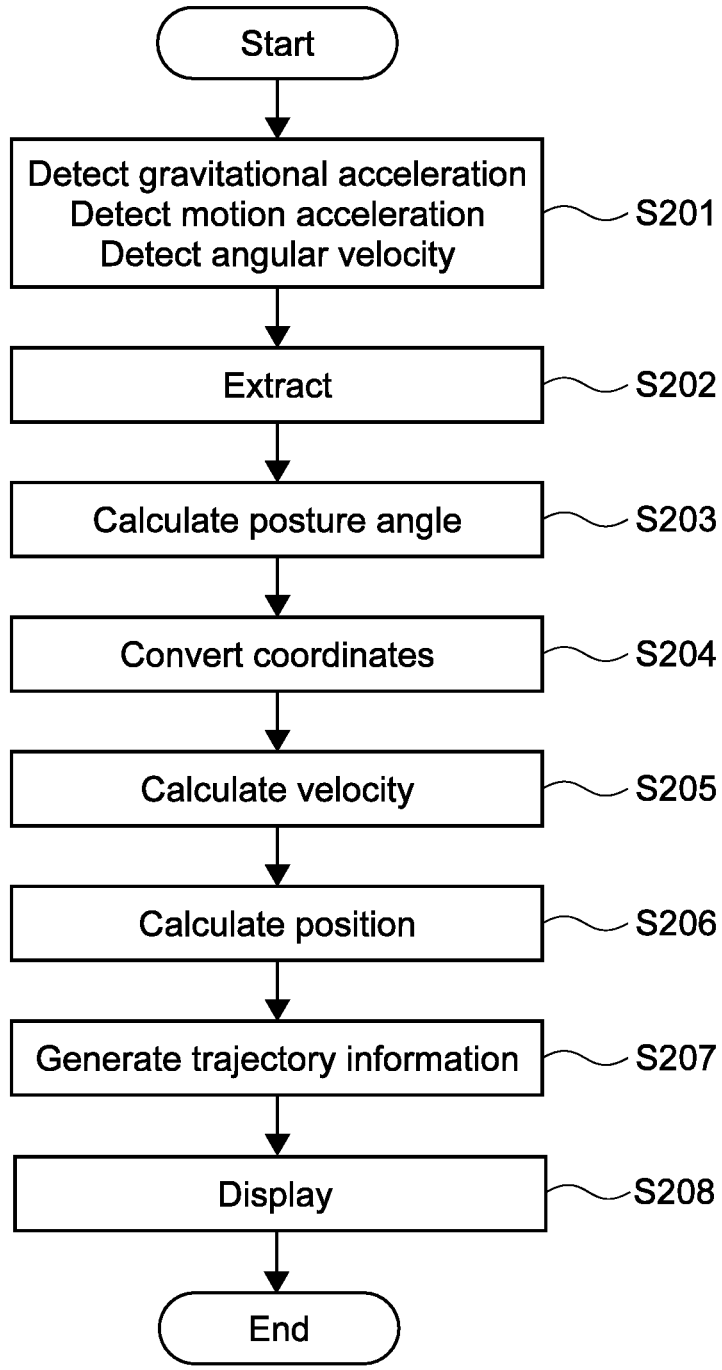
FIG. 20 is a flowchart for describing an operation example of the motion measurement system.

Sequentially, a typical operation of the motion measurement system 1 configured as described above will be described with reference to FIGS. 19 and 20. FIG. 20 is a flowchart for describing an operation example of the motion measurement system 1.

When the system is activated by power-on or the like, the sensor device 1A detects, by the detector unit (inertial sensor) 40, the gravitational acceleration components (static acceleration components), the motion acceleration components (dynamic acceleration components), and angular velocity components ($\omega_x$, $\omega_y$, $\omega_x$) in the local coordinate system of the sensor device 1A (Step 201). The detected gravitational acceleration components, motion acceleration components, and angular velocity components are output to the controller unit 50.

In Step 201, the detection of the gravitational acceleration components (static acceleration components) and the motion acceleration components (dynamic acceleration components) is performed by separating the first and second acceleration detection signals detected in the acceleration sensor element 10 into the gravitational acceleration components (static acceleration components) and the motion acceleration components (dynamic acceleration components), and this separation is performed by the processing method described above using FIG. 19. Further, the angular velocity components are detected by the angular velocity sensor element 30.

The extraction unit 51 extracts the motion acceleration components (dynamic acceleration components) and the angular velocity signals except the gravitational acceleration components (static acceleration components) among the velocity-related information Vo and the angular velocity components output to the controller unit 50 (Step 202). The extracted motion acceleration components (Acc-x, Acc-y, Acc-z) and angular velocity signals ($\omega$-x, $\omega$-y, $\omega$-z) are output to the inertial navigation calculation unit 57.

For the angular velocity signals ($\omega$-x, $\omega$-y, $\omega$-z) supplied to the inertial navigation calculation unit 57, the posture angles ($\theta x$, $\theta y$, $\theta z$) are calculated by the posture angle calculation unit 53 (Step 203). Furthermore, the coordinates of the acceleration components (ax, ay, az) in the local coordinate system are converted by the coordinate rotation unit 52 into the coordinates of the acceleration components (aX, aY, aZ) in the global coordinate system (Step 204).

Subsequently, the inertial navigation calculation unit 57 performs time integration on the acceleration components (aX, aY, aZ) in the first integrator 55 by using the point-of-time information from the point-of-time information acquisition unit 54 and calculates the velocity components (vX, vY, vZ) in the global coordinate system (Step 205). Next, the inertial navigation calculation unit 57 performs time integration on the velocity components (vX, vY, vZ) in the second integrator 56 and calculates the position components (pX, pY, pZ) in the global coordinate system (Step 206).

The output information generation unit 58 generates the trajectory image signal (control signal) S0 for displaying a change in posture of the user U in the form of a trajectory on the display unit 407 on the basis of the calculated position components (pX, pY, pZ) and posture angles (θx, θy, θz) (Step 207). The generated trajectory image signal (control signal) S0 is output to the transmission/reception unit 101. Assuming that the user U is in the static state at a downswing start point as the start of a motion of the user U, the output information generation unit 58 detects an initial state (downswing start state) of the user U from the accelerations detected in the acceleration sensor element 10 and sets the state as an initial posture.

The terminal device 1B causes the trajectory to be displayed in a predetermined form on the display unit 407 on the basis of the trajectory image signal (control signal) S0 input to the terminal device 1B via the transmission/reception unit 404 of the terminal device 1B (S208). Examples of the display forms include display of a trajectory indicating a temporal change in posture of the user U, i.e., a change in position of the user U as a kinematic physical quantity. The trajectory described above is fed into the memory 402. It should be noted that the trajectory is displayed in this embodiment, but a log such as an acceleration, a velocity, or a position associated with the point-of-time information may be displayed on the display unit 407. The log is also fed into the memory 402.

In such a manner, according to this embodiment, since the motion of the sensor device 1A attached to the user U is displayed for the user U as an image of a trajectory of the motion, the user U can grasp the motion posture or trajectory by the sense of sight.

For example, in the swing practice shown in FIG. 2, the user U can visually recognize the trajectory of the motion of the golf club 3, to which the sensor device 1A is attached, on the display unit 407.

According to this embodiment, since the angular velocity sensor element 30 is provided in addition to the acceleration sensor element 10, it is possible to detect not only the accelerations in the three-axis directions but also the angular velocities about the three axes. With this configuration, as compared to a case where only the acceleration sensor element 10 is provided, it is possible to simultaneously refer to the acceleration information and the angular velocity information and achieve further improvement in the detection accuracy of a motion, a posture, a position, or the like of a detection target.

As described above, in this embodiment, the detector unit (inertial sensor) 40 that can substantially separate the dynamic acceleration components and the static acceleration components from each other is provided to calculate the position of the user U on the basis of the substantially separated dynamic acceleration components, and thus the position of the user U can be more correctly grasped.

In other words, conventionally, the gravitational acceleration components (static acceleration components) have been estimated with the gyro sensor, and on the basis of a result of cancelling the gravitational acceleration components (static acceleration components) from the detection accelerations detected with the acceleration sensor, the position of the user U has been calculated. In such a conventional method, due to a detection error of the gyro sensor during the motion of the user U, a correct position of the user has not been able to be obtained.

In contrast to this, in this embodiment, the detection accelerations of the inertial sensor, which include both of the dynamic acceleration components and the static acceleration components, are separated into the dynamic acceleration components and the static acceleration components, and the separated dynamic acceleration components are extracted to calculate a position of the user U on the basis of the extracted components, in which the gravitational acceleration components are not cancelled by using the gyro sensor. Therefore, the position information does not diverge by the accumulated errors caused by the gyro sensor, and the position of the moving user U can be substantially correctly calculated. In such a manner, it is possible to correctly calculate a change in kinematic physical quantity such as an acceleration, a velocity, or a position of the user U, and for example, grasp a motion posture, a motion trajectory, and the like of the user U.

In this embodiment, since the sensor device is mounted to a detection target and a change in posture of the detection target is measured, a measurement range is not limited, outdoor use is available, and less restrictions on a measurement place and a measurement range are provided, as compared to a remote measurement method by which a sensor is installed at a place distant from a measurement target and the measurement can be performed only within a space where the sensor works. Further, it has been difficult to follow a fast motion in sports in an optical measurement method, whereas the measurement apparatus of this embodiment can follow a fast motion in sports.

Hereinabove, the embodiment of the present technology has been described, but the present technology is not limited to the embodiment described above and can be variously modified as a matter of course.

For example, in the embodiment described above, the sensor device is attached to the exercise tool, but the present technology is not limited thereto as a matter of course. The sensor device may be attached to the user himself/herself who uses the exercise tool. Further, the present technology is also applicable to the practice of dances, communication using a gesture, ecological survey of animals, and the like.

Furthermore, in the embodiment described above, the example in which the control signal S0 is output as an image display signal has been mainly described, but in addition to the image display, signals of color, sound, and the like may be output in combination. For example, diverse expressions such as expressing a velocity of a motion of a user by using sound and expressing a trajectory by image display are applicable. It may be configured such that the motion of the golf club 3 is reproduced as a moving image on the display unit 407, and the trajectory of the golf club 3 is displayed during reproduction, and sound may also be output for the motion of the golf club 3 at the time of reproduction of the moving image. Additionally, sound may be output such that a pitch or volume of the sound is changed according to a change in velocity of the motion of the golf club 3. With this configuration, a change in motion of the golf club can be intuitively grasped from the change of the output sound, and a swing operation can be checked also by the sense of hearing in addition to the sense of sight.

Further, in the embodiment described above, a single sensor device is mounted to a detection target and a change in motion of the detection target is calculated as a trajectory, but it is also possible to mount a plurality of sensor devices to a detection target as a matter of course.

Figure 21:
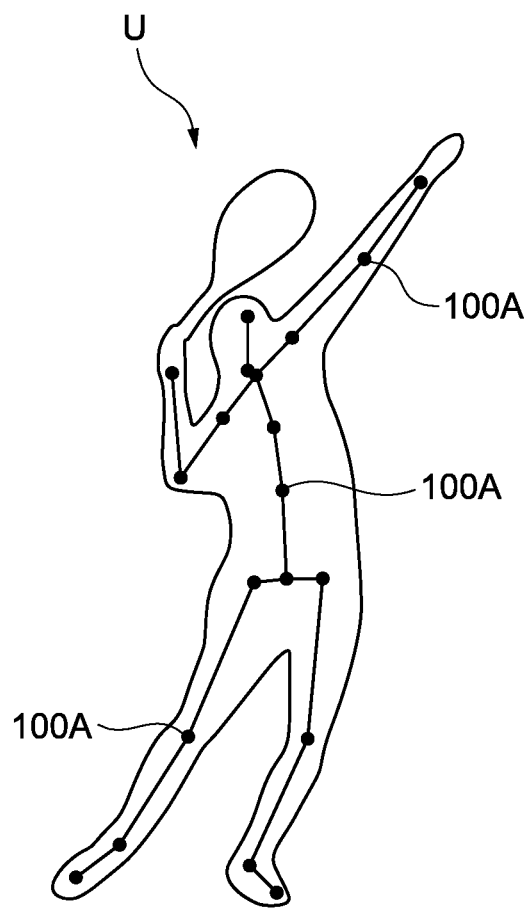
FIG. 21 is a schematic view for describing another application example of the motion measurement system.

FIG. 21 shows an example in which a plurality of sensor devices 100A are attached to a tennis player (user U) as a detection target. The structure of the sensor device 100A is substantially the same as that of the sensor device 1A described above, and an appearance structure differs depending on a place at which the sensor device is to be attached. In the figure, a black point represents the sensor device 100A. Here, the sensor devices 100 are attached to 20 sites of the body of the tennis player (user U). The sensor device 100A is basically attached to a joint site of the body and is configured such that the start point of calculation is a node point. In such a manner, when a plurality of sensor devices 100A are attached to a plurality of sites of the body of the user U, a motion posture (form) of the user U and a temporal change of the motion posture can be detected on the basis of signals detected by the sensor devices 100A.

Further, in the above embodiment, the acceleration sensor element 10 shown in FIGS. 6 to 8 is used as a sensor element, but the configuration is not particularly limited as long as the sensor element can detect the accelerations in the three-axis directions. Similarly, the calculation method of extracting the dynamic acceleration components and the static acceleration components from the accelerations that act on the sensor elements is not also limited to the example described above, and an appropriate calculation technique can be employed.

It should be noted that the present technology can also have the following configurations.

(1) An information processing apparatus, including
  a controller unit that
    extracts, from an acceleration in each direction of three axes that includes a dynamic acceleration component and a static acceleration component of a detection target that moves within a space, the dynamic acceleration component of the detection target, and
    generates, as a control signal, a change in kinematic physical quantity of the detection target from the dynamic acceleration component.

(2) The information processing apparatus according to (1), in which
  the controller unit
    calculates a temporal change in position of the detection target within the space from the dynamic acceleration component, and
    generates the control signal on a basis of the temporal change in position.

(3) The information processing apparatus according to (1) or (2), in which
  the controller unit includes an acceleration arithmetic unit that extracts the dynamic acceleration component and the static acceleration component for each direction of the three axes on a basis of a first detection signal having an alternating-current waveform corresponding to the acceleration and a second detection signal having an output waveform in which an alternating-current component corresponding to the acceleration is superimposed on a direct-current component.

(4) The information processing apparatus according to (3), in which
  the acceleration arithmetic unit includes an arithmetic circuit that extracts the static acceleration component from the acceleration on a basis of a difference signal between the first detection signal and the second detection signal.

(5) The information processing apparatus according to (4), in which
  the acceleration arithmetic unit further includes a gain adjustment circuit that adjusts gain of each signal such that the first detection signal and the second detection signal have an identical level.

(6) The information processing apparatus according to (4) or (5), in which
  the acceleration arithmetic unit further includes a correction circuit that calculates a correction coefficient on a basis of the difference signal and corrects one of the first detection signal and the second detection signal by using the correction coefficient.

(7) The information processing apparatus according to any one of (3) to (6), in which
  the controller unit further includes an angular velocity arithmetic unit that calculates an angular velocity about each of the three axes on a basis of a third detection signal including information related to the angular velocity about each of the three axes.

(8) The information processing apparatus according to any one of (1) to (7), further including
  a detector unit that acquires the acceleration.

(9) The information processing apparatus according to (8), in which
  the detector unit includes a sensor element including
    an element main body that includes a movable portion movable by reception of an acceleration,
    a piezoelectric first acceleration detector unit that outputs a first detection signal including information related to the acceleration in each direction of the three axes that acts on the movable portion, and
    a non-piezoelectric second acceleration detector unit that outputs a second detection signal including information related to the acceleration in each direction of the three axes that acts on the movable portion.

(10) The information processing apparatus according to (9), in which
  the second acceleration detector unit includes a piezoresistive acceleration detection element that is provided to the movable portion.

(11) The information processing apparatus according to (9), in which
  the second acceleration detector unit includes an electrostatic acceleration detection element that is provided to the movable portion.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 motion measurement apparatus (motion measurement system)
1A, 100A sensor device
1B terminal device
3 golf club
10 acceleration sensor element
11 first acceleration detector unit
12 second acceleration detector unit
40 detector unit (inertial sensor)

50 controller unit
20 controller
110 element main body
120 movable plate (movable portion)
200 acceleration arithmetic unit
S0 trajectory image signal (control signal)
Vo velocity-related information

The invention claimed is:

1. An information processing apparatus, comprising
a controller unit that
   extracts, from an acceleration in each direction of three axes that includes a dynamic acceleration component and a static acceleration component of a detection target that moves within a space, the dynamic acceleration component of the detection target, and
   generates, as a control signal, a change in kinematic physical quantity of the detection target from the dynamic acceleration component, and
wherein the controller unit includes an acceleration arithmetic unit that extracts the dynamic acceleration component and the static acceleration component for each direction of the three axes on a basis of a first detection signal having an alternating-current waveform corresponding to the acceleration and a second detection signal having an output waveform in which an alternating-current component corresponding to the acceleration is superimposed on a direct-current component.

2. The information processing apparatus according to claim 1, wherein
the controller unit
   calculates a temporal change in position of the detection target within the space from the dynamic acceleration component, and
   generates the control signal on a basis of the temporal change in position.

3. The information processing apparatus according to claim 1, wherein
the acceleration arithmetic unit includes an arithmetic circuit that extracts the static acceleration component from the acceleration on a basis of a difference signal between the first detection signal and the second detection signal.

4. The information processing apparatus according to claim 3, wherein
the acceleration arithmetic unit further includes a gain adjustment circuit that adjusts gain of each signal such that the first detection signal and the second detection signal have an identical level.

5. The information processing apparatus according to claim 3, wherein
the acceleration arithmetic unit further includes a correction circuit that calculates a correction coefficient on a basis of the difference signal and corrects one of the first detection signal and the second detection signal by using the correction coefficient.

6. The information processing apparatus according to claim 1, wherein
the controller unit further includes an angular velocity arithmetic unit that calculates an angular velocity about each of the three axes on a basis of a third detection signal including information related to the angular velocity about each of the three axes.

7. The information processing apparatus according to claim 1, further comprising
a detector unit that acquires the acceleration.

8. The information processing apparatus according to claim 7, wherein
the detector unit includes a sensor element including
   an element main body that includes a movable portion movable by reception of an acceleration,
   a piezoelectric first acceleration detector unit that outputs a first detection signal including information related to the acceleration in each direction of the three axes that acts on the movable portion, and
   a non-piezoelectric second acceleration detector unit that outputs a second detection signal including information related to the acceleration in each direction of the three axes that acts on the movable portion.

9. The information processing apparatus according to claim 8, wherein
the second acceleration detector unit includes a piezoresistive acceleration detection element that is provided to the movable portion.

10. The information processing apparatus according to claim 8, wherein
the second acceleration detector unit includes an electrostatic acceleration detection element that is provided to the movable portion.

* * * * *